(12) United States Patent
Fujii et al.

(10) Patent No.: US 7,180,677 B2
(45) Date of Patent: Feb. 20, 2007

(54) DISPLAY DEVICE

(75) Inventors: Takamichi Fujii, Kanagawa (JP); Atsushi Oosawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 502 days.

(21) Appl. No.: 10/768,670

(22) Filed: Feb. 2, 2004

(65) Prior Publication Data

US 2004/0196525 A1    Oct. 7, 2004

(30) Foreign Application Priority Data

Jan. 31, 2003  (JP)  ............................. 2003-024006
Mar. 20, 2003  (JP)  ............................. 2003-077920

(51) Int. Cl.
*G02B 1/06*        (2006.01)

(52) U.S. Cl. ...................... 359/665; 359/295

(58) Field of Classification Search ................ 359/295, 359/641, 896, 253, 665
See application file for complete search history.

(56) References Cited

FOREIGN PATENT DOCUMENTS

JP          9-311643 A      12/1997
JP          10-39800 A       2/1998

*Primary Examiner*—Ricky Mack
*Assistant Examiner*—Jerry Fang
(74) *Attorney, Agent, or Firm*—Sughrue Mion, PLLC

(57) ABSTRACT

A display device includes a first substrate, a first electrode provided on the first substrate, an insulation layer provided on the first electrode, a second electrode provided on the insulation layer, a cavity partition surrounding the second electrode with an interval therebetween, a second substrate provided on the cavity partition, and a droplet of a coloring liquid sealed in the cavity partition. In the display device, a third electrode for promoting restoration of the droplet of a coloring liquid to a spherical shape is provided. In the display device, the insulation layer includes a insulator film and a low surface energy film; the insulator film assumes a specific inductive capacity of three or more and a thickness of 10 nm to 100 nm; and the low surface energy film assumes a thickness of 100 nm or less.

4 Claims, 14 Drawing Sheets

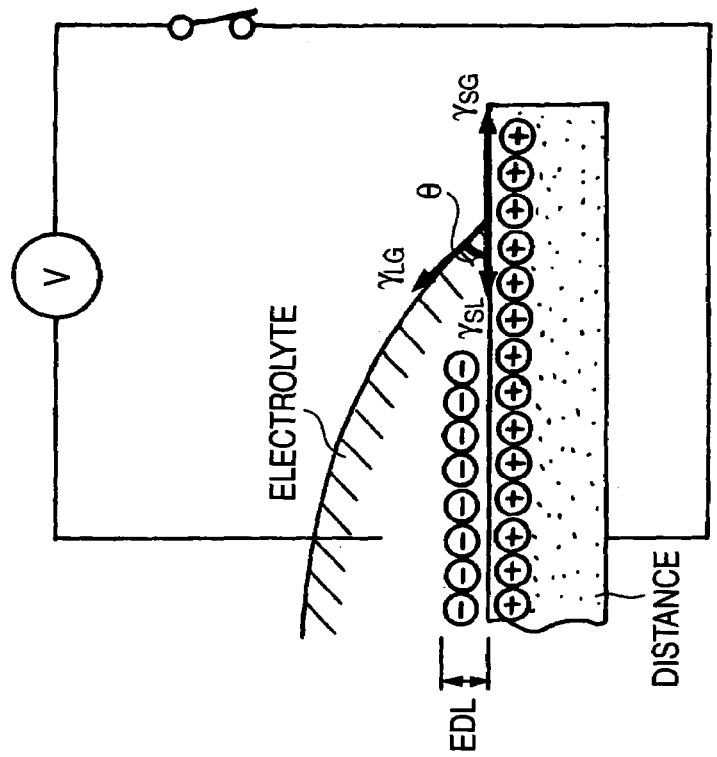
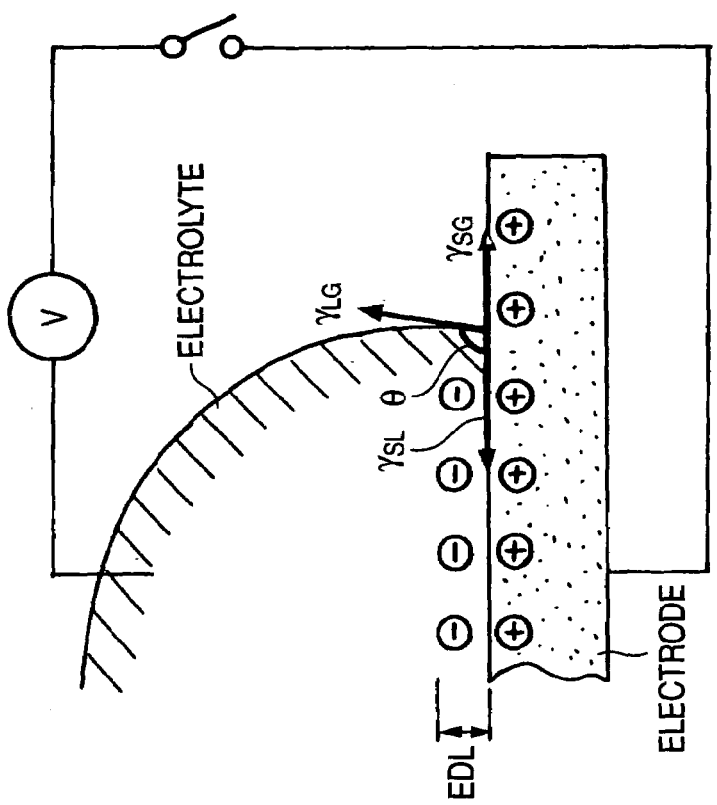

AREA RATIO = A2/A1

DISPLAY DEVICE

BACKGROUND OF THE INVENTION

1. Field of the Invention

The invention relates to a display device of optical shutter type which changes the quantity of light entering an aperture by means of changing the size of a droplet of a coloring liquid by utilization of an electrowetting phenomenon, and more particularly, to a technique for promoting restoration of spherical shape of the droplet of a coloring liquid.

2. Description of the Related Art

A liquid-crystal display device (LCD), a plasma display (PDP) device, a guest-host LCD, an electro-chromic display (ECD), an electrophoresis display (EPD), an organic EL display (OLED) and the like have hitherto been known as related-art display devices.

However, these known display devices suffer many problems in terms of luminance, contrast ratio, resolution, screen size, an increase in definition, responsiveness, lifetime, display of gradation, and manufacturing costs. None of them is suitable for use as a medical display which satisfies all requirements; i.e., high luminance (1000 cd/m$^2$), high contrast ratio (1000:1), high definition (200 ppi), and a large area (800×1200 mm).

Among these display devices, the LCD is superior. However, the LCD employs a polarizing plate, and hence black luminance becomes high for reasons of leakage of light. Further, the LCD has dependence on a viewing angle (hereinafter called a "viewing angle dependency"), which in turn poses a problem in utilization of the display device by many people and gives rise to eye strain. In the case of a display device of spontaneous illumination, such as a PDP or an OLED, neither sufficient luminance nor a sufficient contrast ratio is obtained, thereby posing difficulty in achieving uniform luminance over the entire screen (i.e., a problem of luminance variations). If uniform luminance is achieved by rendering the entire screen bright, the display device will suffer from a problem of short lifetime. Moreover, difficulty is encountered in rendering the definition of the PDP high.

As described in JP-A-9-311643 and JP-A-10-39800, a display device of optical shutter type has already been known, wherein the quantity of light entering an aperture is changed by means of changing the size of a droplet of a coloring liquid by utilization of the electrowetting phenomenon.

JP-A-9-311643 and JP-A-10-39800 relate to a display utilizing an electrowetting phenomenon (in the publications the phenomenon is referred to as an "electrocapillarity").

JP-A-9-311643 offers a method for manufacturing an electronic display sheet. The electronic display sheet is formed from: first and second sheets, each having an external surface and an internal surface; and a sealed space existing between the internal surfaces of the first and second sheets. The first sheet has electrode means of first type provided on the internal surface of the sheet, an insulation layer disposed over the electrode means of first type, and electrode means of second type which is placed on top of the insulation layer and exposed to the sealed space. The insulation layer is formed and arranged to isolate the electrode means of first type from the electrode means of second type. The electronic display sheet further comprises means for impelling small droplets placed in the sealed space covering the electrode means of second type and energizing the electrode means of first and second types. When the electrode means of first and second types are energized, droplets are enlarged.

JP-A-10-39800 describes an electrocapillary display sheet utilizing a plurality of sets of conductive droplets of a coloring liquid within a space existing between two sheets. Respective sets of droplets of a coloring liquid are allocated corresponding electrodes provided on the respective sheets. A droplet of a coloring liquid belonging to each set is not blended with another droplet of a coloring liquid in the same set. Respective droplets of a coloring liquid possess electrical connection, and droplets of a coloring liquid belonging to the respective sets are selectively activated. As a result, at least one droplet of a coloring liquid in one droplet set spreads into a space shared by the droplets of a coloring liquid belonging to the respective sets, thereby forming color pixels of an image.

In any of these display devices, spread of the droplet of a coloring liquid is accelerated by the force of an electric field. However, the droplet of a coloring liquid returns by means of only a water repellent characteristic, and hence returning of the droplet becomes slow, thus deteriorating responsiveness. Hence, display of animation is difficult.

In addition, according to the related-art technique, the low-surface energy film, which is included in the insulation layer, is imparted with an insulation characteristic. Hence, in order to change the contact angle, the low-surface energy film must be made thin. However, a reduction in the thickness of the low-surface energy film results in leakage of an electric current, thus failing to achieve sufficient insulation performance.

Specifically, according to the related-art technique, the insulation layer formed by combination of the insulation film and the low-surface energy film has a thickness on the order of microns. The insulation film and the low-surface energy film are formed from a single material in an integrated fashion. A PTFE [polytetrafluoroethylene: Teflon (trade name)]-based material having specific inductive capacity of 2.1 is used. Changing the area of a droplet by changing the contact angle θ through several degrees requires a voltage of 100 V or more. Thus, the related-art technique is not practical.

In any of these display devices, spreading of a droplet of coloring liquid is poor, and the display device has a low numerical aperture, thus deteriorating utilization efficiency of light.

SUMMARY OF THE INVENTION

The invention has been conceived to solve the drawbacks and provides a display device which improves display responsiveness and enables display of animation by speeding up return of droplets of a coloring liquid and improving display responsiveness.

The invention is intended for solving the drawbacks set forth by separating the low-surface energy film from the insulation film, rendering the low-surface energy film as thin as possible, and enabling an efficient change in contact angle through use of an insulation film having high specific inductive capacity. Therefore, the invention provides a display device having a large numerical aperture and high utilization efficiency of light.

In addition to providing the display device, the invention also aims at obtaining another display device having superior utilization efficiency of light by recycling the light traveling toward a droplet of coloring liquid through reflection, which would otherwise be absorbed by the droplet.

According to a first aspect of the invention, there is provided a display device including a first substrate constituting a lowest layer of the display device, a first electrode provided on the first substrate, an insulation layer provided on the first electrode, a second electrode provided on the insulation layer, a cavity partition surrounding the second electrode with an interval therebetween, a second substrate which is provided on the cavity partition and constitutes a highest layer of the display device, a droplet of a coloring liquid sealed in the cavity partition and a third electrode provided for promoting restoration of the droplet of a coloring liquid to a spherical shape.

By means of adoption of such a configuration, restoration of the droplet of a coloring liquid becomes faster, and hence display responsiveness is improved, making display of animation feasible.

According to a second aspect of the invention, there is provided a display device as set forth in the first aspect of the invention, wherein the third electrode is provided at one or more of the following locations; that is, the vicinity of the second electrode, the inside of the second substrate, and the inside of the cavity partition, while being insulated from the second electrode.

By means of adoption of such a configuration, the third electrode can be arranged at an effective position, thereby rendering restoration of the droplet of a coloring liquid faster.

According to a third aspect of the invention, there is provided a display device as set forth in the first or second aspect of the invention, wherein the second or third electrode is a transparent electrode.

By means of adoption of such a configuration, backlight can pass through the display device at high efficiency.

According to a fourth aspect of the invention, there is provided a display device as set forth in any of the first to third aspects of the invention, further comprising a drive source for changing a droplet of a coloring liquid from a steady state and another drive source for restoring the changed droplet of a coloring liquid to the steady state.

By means of adoption of such a configuration, a suitable positive or negative potential can be applied to each of electrodes, thereby accelerating restoration of the droplet of a coloring liquid.

By means of the foregoing configurations, restoration of the droplet of a coloring liquid becomes faster, and display responsiveness is improved. Consequently, there can be obtained a display device which enables display of animation by improving display responsiveness.

According to a fifth aspect of the invention, there is provided a display device including a first substrate constituting a lowest layer of the display device, a first electrode provided on the first substrate, an insulation layer provided on the first electrode, a second substrate provided with an interval to the insulation layer and constituting a highest layer of the display device, a cavity partition provided between the insulation layer and the second substrate so as to surround the interval and a droplet of a coloring liquid sealed in the cavity partition, wherein the first electrode is divided in mutually insulated plural units, and a polarity of the first electrode provided in a predetermined area of the first substrate and a polarity of the first electrode other than in the predetermined area are made different and made interchangeable.

According to a sixth aspect of the invention, there is provided a display device as set forth in the fifth aspect of the invention, further comprising a second electrode, the second electrode being provided at least either within the second substrate or within the cavity partition, while being insulated from the first electrode.

By means of the foregoing configurations, a movement of the droplet of the coloring liquid along a planar direction of the insulation layer can be accelerated. Due to this, a movement of the droplet of the coloring liquid can be executed promptly between different areas of the insulation layer. Consequently, there can be obtained a display device which enables display of animation by improving display responsiveness.

A display device according to a seventh aspect of the invention is a display device having a first substrate constituting the lowest layer of a display device, a first electrode provided on the first substrate, an insulation layer formed from an insulator film provided on the first electrode and a low surface energy film, a second electrode provided on the insulation layer, a cavity partition surrounding the second electrode with an interval therebetween, a second substrate which is provided on the cavity partition and constitutes the highest layer, and a droplet of a coloring liquid sealed in the cavity partition, the display device utilizing an electrowetting phenomenon derived from application of an electric field to the droplet of a coloring liquid, wherein the insulator film assumes a specificinductive capacity of three or more and a thickness from 10 nm to 100 nm; and the low surface energy film assumes a thickness of 100 nm or less.

According to an eight aspect of the invention, the display device of the seventh aspect of the invention is characterized in that the low surface energy film assumes a surface energy of 20 mN/in or less.

According to a ninth aspect of the invention, the display devices of the seventh and eight aspects of the invention are characterized in that the low surface energy film assumes a surface roughness of 5 nm to 45 nm.

By means of these configurations, the low surface energy film is separated from the insulator film, and the low surface energy film is made more slim. A film having high specific inductive capacity is used for the insulator film, thereby enabling an efficient change in contact angle. Consequently, there can be obtained a display device having a large numerical aperture and superior utilization efficiency of light.

According to a tenth aspect of the invention, the display device of the seventh through ninth aspects of the invention are characterized in that halftone display is made feasible by means of changing a voltage applied between the first and second electrodes.

By means of such a configuration, halftone display having a density of 0% to 100% can be effected.

According to an eleventh aspect of the inventions the display device of the seventh through tenth aspects are characterized in that a reflection plate is provided on an incident-light-side of the first substrate within the range of an area of the first substrate occupied by the droplet of a coloring liquid with no voltage being applied between the first and second electrodes.

In addition to yielding the display device set forth, such a configuration provides a display device capable of recycling light, which would otherwise be absorbed by a droplet of a coloring liquid, thereby improving the utilization efficiency of light to a much greater extent.

BRIEF DESCRIPTION OF THE DRAWINGS

FIG. 2A is a view for describing a change arising when no voltage is applied;

FIG. 2B is a view for describing a change arising when a voltage is applied;

DETAILED DESCRIPTION OF THE INVENTION

The invention will be described in detail by reference to the drawings.

First Embodiment

Figure 1:
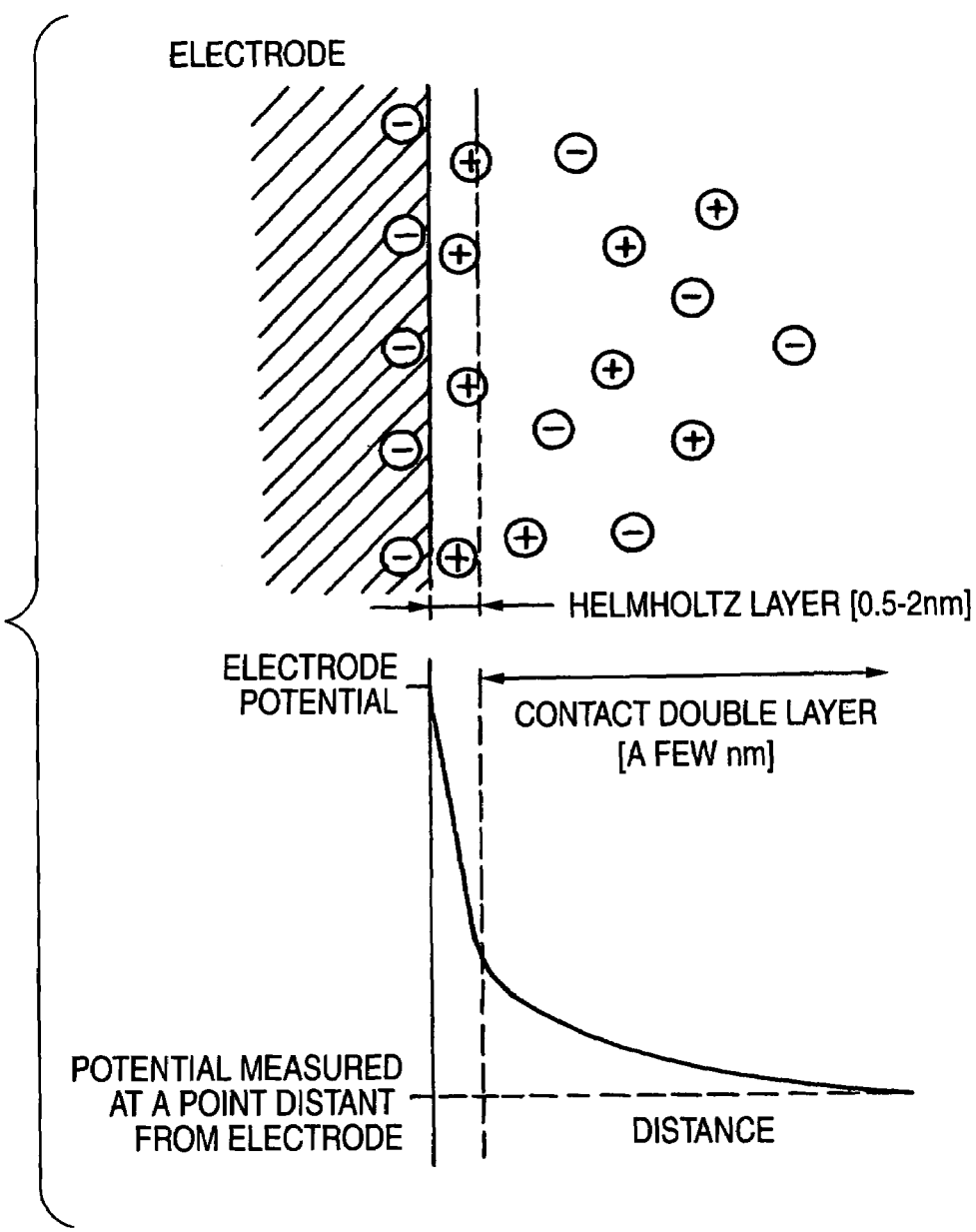
FIG. 1 is a descriptive view of an electrical double layer formed by means of an electrowetting phenomenon.

First, an electrowetting phenomenon utilized by the invention will be briefly described by reference to FIGS. 1 and 2.

When an electrode is dipped into an electrolyte (solution), an interface is formed along a contact surface existing between the surface of the electrode and the solution. As shown in FIG. 1, a so-called electrical double layer EDL is formed on the interface from metal ions and free electrons of the electrode and electrolyte ions of the solution. When an electric field is applied to the metal-electrolyte interface, a change in surface tension is induced. This phenomenon is called the electrowetting phenomenon.

Any conductive material may be used as the electrode. For instance, the electrode may be made of metal such as Pt, Au, Ni, or Al; a metallic oxide such as $SnO_2$, $In_2O_3$, $RuO_2$, or $TiO_2$; a semiconductor such as Ge, Si, or GaAs; or a carbon-based conductive material such as graphite, glassy carbon, or diamond.

FIG. 2 is a view for describing a change in surface tension arising when a voltage is applied to the electrode and when no voltage is applied to the same.

FIG. 2A shows a case where an external voltage V is not applied to the electrode, wherein electric charges appear along the metal-electrolyte interface, to thus form an electrical double layer EDL. FIG. 2B shows a case where the external voltage V is applied to the electrode, wherein a change arises in the density of electric charges in the electrical double layer EDL. As a result, a surface tension γ and a contact angle fluctuate.

In this case, a relational expression between the applied voltage (V) and the resultant surface tension (γ) can be deduced by means of thermodynamic analysis of the interface. The result can be expressed by Eq. (1) through use of Lippmann's equation.

$$\gamma = \gamma_0 - \left(\frac{1}{2}\right)cV^2 \quad (1)$$

Here, $\gamma_0$ denotes surface tension achieved along the solid-liquid interface at no voltage (i.e., no electric charges exist on the surface of the solid).

"c" denotes capacitance per unit area, and a layer of electric charges is hypothesized while a symmetrical Helmholtz capacitor is taken as a model.

When a voltage is applied between the electrolyte and the solid from the outside, a change of state arises in the electric charges and a dipole, thereby causing a change in surface energy in the interface (see FIG. 2). Particularly, when electric charges exist in the interface, the work required to expand a surface region is reduced by repulsion developing between electric charges, which in turn induces a drop in surface tension. Therefore, the surface area is considered to be easy to expand.

Lippmann's equation (1) is expressed through use of a contact angle θ by means of introduction of Young's equation (2).

$$\gamma_{SL} = \gamma_{SG} - \gamma_{LG} \cos \theta \quad (2)$$

$$\cos \theta = \cos \theta_0 + (1/\gamma_{LG}) \times (1/2)cV^2 \quad (3)$$

Here, $\theta_0$ denotes a contact angle which is achieved when the electric field traversing the interface is zero; $\gamma_{SL}$ denotes solid-liquid surface tension; $\gamma_{LG}$ denotes a liquid-gas surface tension; and $\gamma_{SG}$ denotes a solid-gas surface tension.

$\gamma_{LG}$ and $\gamma_{SG}$ are assumed to be constants that are independent of an applied voltage.

A contact angle in Eq. (3) is the function of a voltage applied between liquid and an electrode.

Therefore, as shown in FIG. 2B, when a voltage is applied between liquid and an electrode, contacting liquid expands. This phenomenon is applied to the present invention.

Figure 3A:
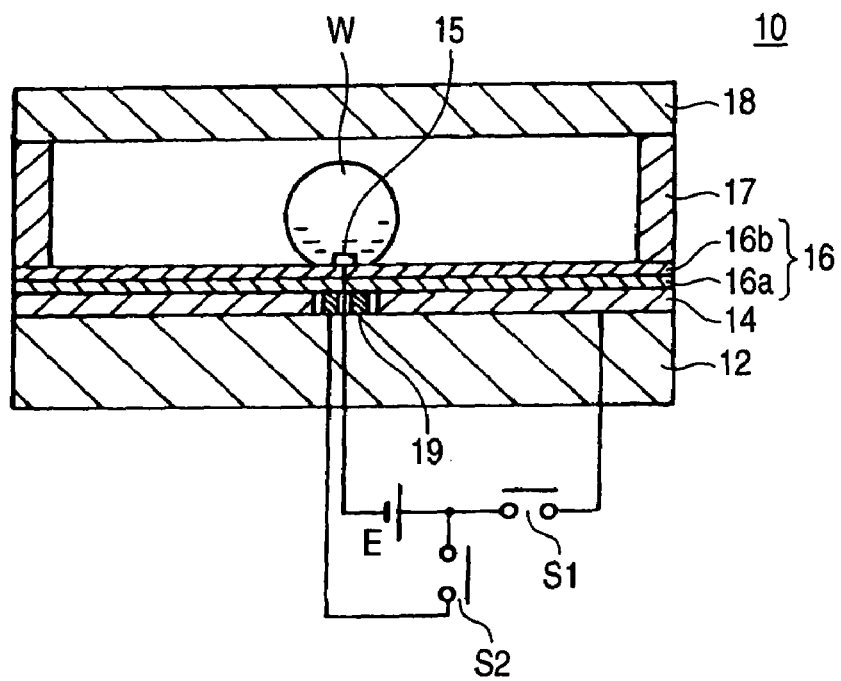
FIG. 3A is a longitudinal cross-sectional view in a first embodiment of the invention.
Figure 3B:
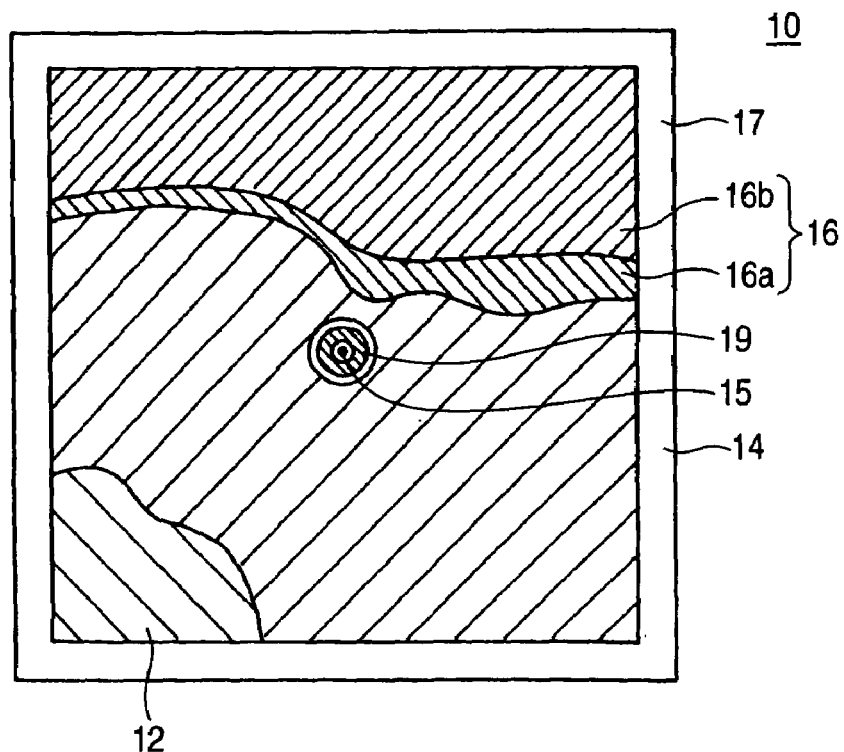
FIG. 3B is a partial cutaway plan view in the first embodiment of the invention.

FIG. 3 relates to the first embodiment of the invention, wherein FIG. 3A is a longitudinal cross-sectional view and FIG. 3B is a partial cutaway plan view.

In the drawings, reference numeral 10 designates a display device according to the first embodiment of the invention; 12 designates a first transparent substrate constituting the lowest layer of the display device 10; 14 designates a first transparent electrode provided on top of the first transparent substrate 12; and 15 designates a second transparent electrode. Materials of the transparent electrodes include, e.g., indium tin oxide (ITO).

Reference numeral 16 designates an insulation layer, and the insulation layer is constituted of a lower insulation film layer 16a, and a lower surface energy film 16b provided on top of the insulation film 16a. The low surface energy film is formed from material having a superior water repellent characteristic. A liquid provided on top of the low surface energy film does not spread and can sustain a spherical shape. Material into which fluororesin particles are dispersed is preferably employed for the low surface energy film. For example, fluororesin particles include polyvinyl fluoride, PVDF, tetrafluoroethylene (TFE) resin, chlorofluoroethylene (CTFE) resin, ETFE, a CTFE-ethylene copolymer, PFA (TFE-perfluoroalkylvinylether copolymer), FEP (TFE-hexafluoropropylene (HFP) copolymer), EPE (TFE-HFP-perfluoroalkylvinylether copolymer), etc.

Reference numeral 17 designates a cavity partition; 18 designates a second transparent substrate constituting the top layer of the display device 10; and 19 designates a third transparent electrode provided according to the invention.

The first transparent electrode 14 is laid on one surface of the bottom of the display device 10 except for a tiny aperture formed at the center of the bottom of the display device 10. The third transparent electrode 19 is provided in the aperture formed in the first transparent electrode 14 with an insulating material sandwiched therebetween. However, the third transparent electrode 19 is not limited to this position and may be provided in the insulation layer 16 or in another position. The second transparent electrode 15 is provided on the low surface energy film 16. As can be seen from FIG. 3B, the second transparent electrode 15 is located at the center of the third transparent electrode 19 when viewed from the top.

Reference symbol "E" denotes a d.c. power source whose negative side is connected to the second transparent electrode 15 and whose positive side is connected to a common node between two switches S1, S2; S1 denotes a switch to be used for opening and closing a connection between the positive side of the d.c. power source E and the first transparent electrode 14; and S2 denotes a switch to be used for opening and closing a connection between the positive side of the power source E and the third transparent electrode 19. Reference symbol W denotes a droplet of a coloring liquid.

Operation of the display device 10 of the first embodiment will now be described.

Figure 4A:
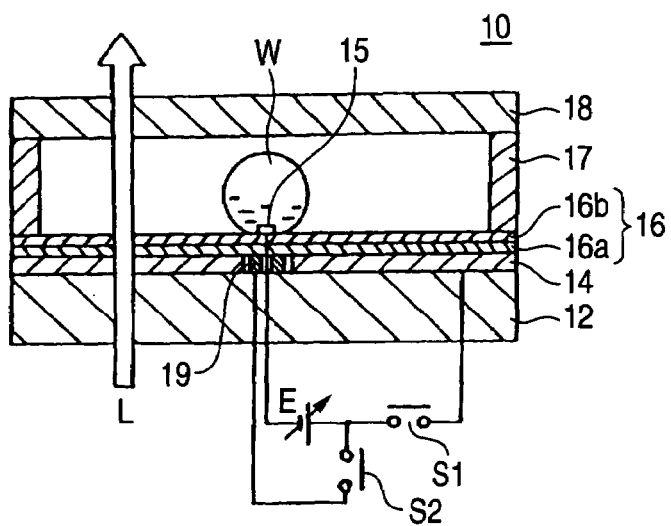
FIG. 4A is a view for describing the service condition of the display device shown in FIGS. 3A and 3B, showing a steady state of the display device.
Figure 4B:
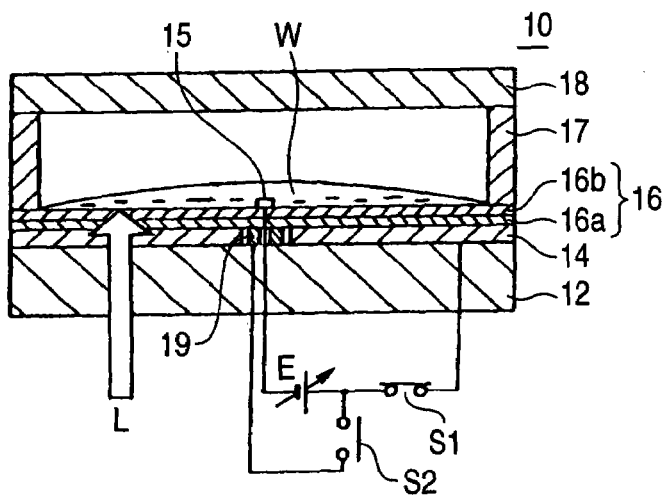
FIG. 4B is a view for describing the service condition of the display device shown in FIGS. 3A and 3B, showing a black display state of the display device.
Figure 4C:
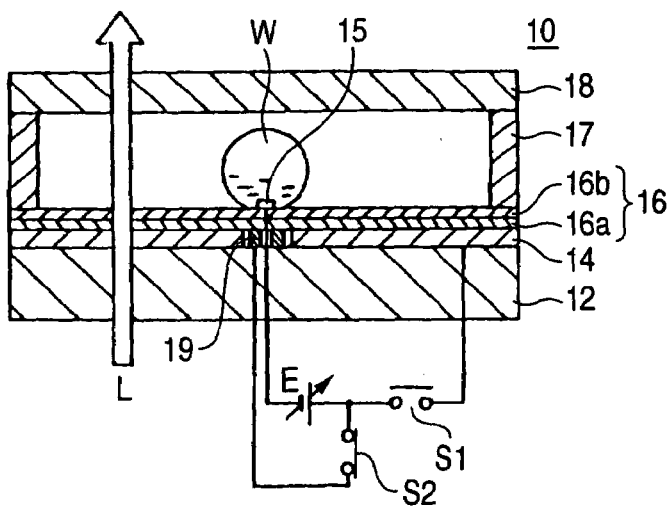
FIG. 4C is a view for describing the service condition of the display device shown in FIGS. 3A and 3B, showing a white display state of the display device.

FIG. 4 is a view for describing the service condition of the display device shown in FIG. 3, wherein FIG. 4A shows a steady state of a droplet of a coloring liquid when the switches S1, S2 are in OFF positions; FIG. 4B shows a black display state; and FIG. 4C shows a white display state.

In FIG. 4A, the switches S1, S2 remain in OFF (open) positions, wherein the steady state of the droplet of the coloring liquid is in a "droplet shrinkage" (spherical) state. Accordingly, light L passes through, in this order, the first transparent substrate 12, the first transparent electrode 14, the insulation film 16a, the low surface energy film 16b, the inside of the cavity, and the second transparent substrate 18. Hence, the display becomes bright.

FIG. 4B shows that the switch S1 is in an ON position and the switch S2 is in an OFF position. As a result, the voltage E is applied between the first transparent electrode 14 and the second transparent electrode 15, whereupon the first transparent electrode 14 becomes positive and the second transparent electrode 15 becomes negative. Since the droplet W of a coloring liquid induces electric charges on the surface of the liquid, the droplet W of a coloring liquid is attracted by the first transparent electrode 14 remaining at the positive potential, whereby the droplet of a coloring liquid spreads fully over the bottom of the cavity.

Consequently, the light L reaches the droplet W of a coloring liquid remaining in the cavity after having passed through, in this order, the first transparent substrate 12, the first transparent electrode 14, the insulation film 16a, the low surface energy film 16b, and the droplet W of a coloring liquid in the cavity. The light is then shielded by the droplet, whereupon the display becomes dark.

FIG. 4C brings the display bright by means of forcefully returning the liquid. As a result of the switch S1 being deactivated and the switch S2 being activated, the second transparent electrode 15 becomes negative, and the third transparent electrode 19 of the embodiment becomes positive. Since the droplet W of a coloring liquid is attracted by the third transparent electrode 19 remaining at the positive potential, the droplet W of a coloring liquid comes to be rapidly shrunk from the expanded state shown in FIG. 4B to the spherical shape shown in FIG. 4C.

Therefore, the light L passes through, in this order, the first transparent substrate 12, the first transparent electrode 14, the insulation film 16a, the low surface energy film 16b, the inside of the cavity, and the second transparent substrate 18. Hence, switching is made to a "bright" display quickly.

FIG. 4B shows an embodiment in which the maximum brightness of the display device is obtained by applying the voltage E between the first transparent electrode 14 and the second transparent electrode 15. The extent to which the droplet W of a coloring liquid spreads can be controlled by changing the applied voltage within the range of 0 to E. Hence, the quantity of light passing through the cavity can be controlled, thereby enabling control of half-tone brightness.

Figure 5A:
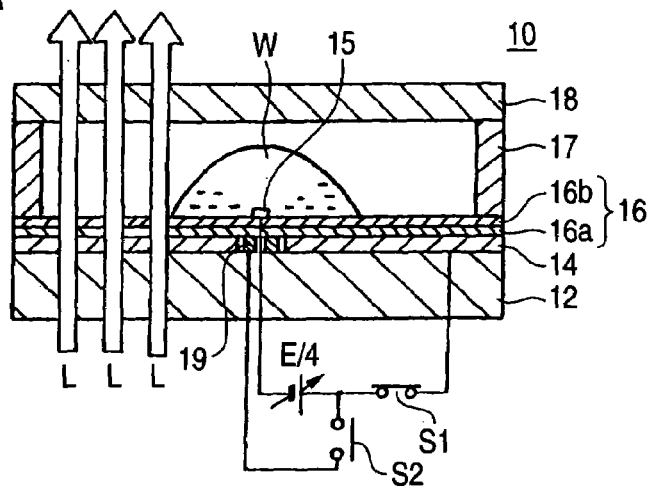
FIG. 5A is a view showing an example of half-tone control in the first embodiment of the invention, showing the case where the voltage applied between the first and second transparent electrodes is $(\frac{1}{4})E$.
Figure 5B:
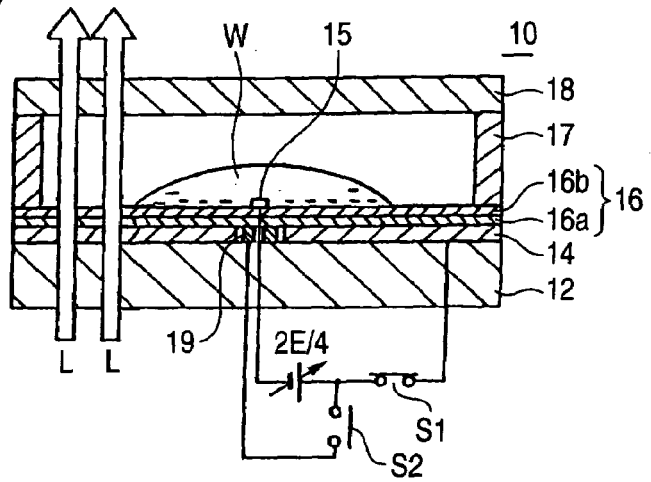
FIG. 5B is a view showing an example of half-tone control in the first embodiment of the invention, showing the case where the voltage applied between the first and second transparent electrodes is $(\frac{1}{2})E$.
Figure 5C:
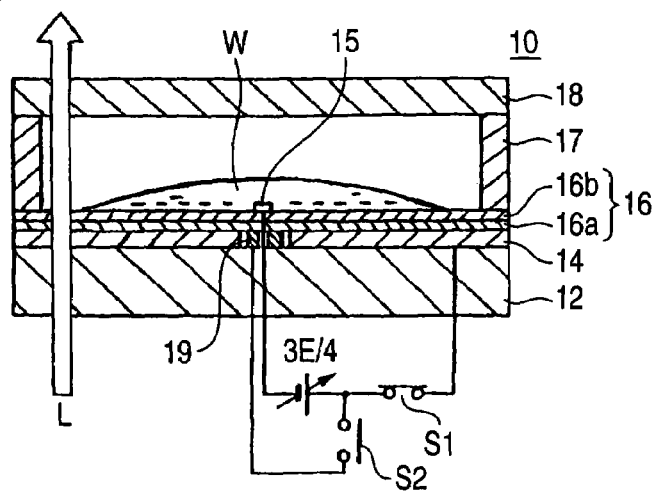
FIG. 5C is a view showing an example of half-tone control in the first embodiment of the invention, showing the case where the voltage applied between the first and second transparent electrodes is $(\frac{3}{4})E$.

FIG. 5 shows example halftone control. The voltage applied between the first transparent electrode 14 and the second transparent electrode 15 is set to (¼)E in FIG. 5A, (½)E in FIG. 5B, and (¾)E in FIG. 5C.

Therefore, the droplet spreads to a small extent at the applied voltage (¼)E shown in FIG. 5A, and there is achieved brightness corresponding to a transmissivity of about 75%, which falls short of the brightness achieved in the embodiment shown in FIG. 4B.

The droplet spreads to about half the bottom of the cavity at the applied voltage (½)E shown in FIG. 5B, and there is achieved brightness corresponding to a transmissivity of about 50%.

The droplet spreads to a fair extent at the applied voltage (¾)E shown in FIG. 5C, and there is achieved brightness corresponding to a transmissivity of about 25%.

The half-tone brightness can be controlled by means of changing the applied voltage E within the range of 0 to E.

Figure 6A:
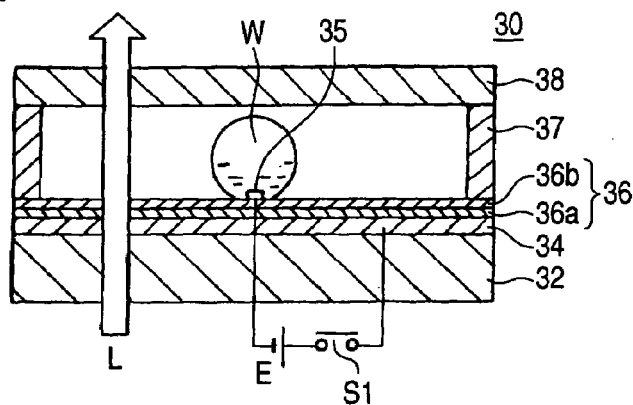
FIGS. 6A, 6B and 6C show longitudinal cross-sectional views of a related-art display device serving as comparative examples.
Figure 6B:
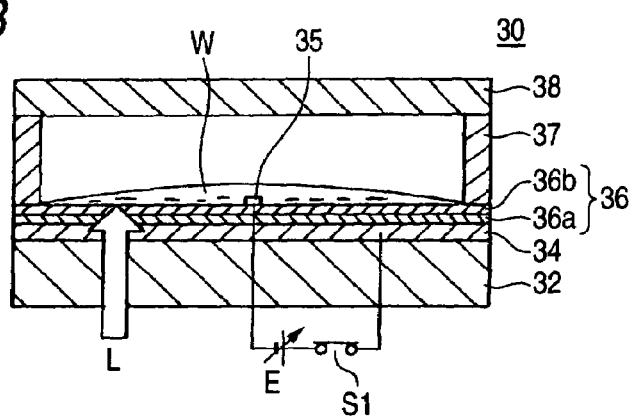
Figure 6C:
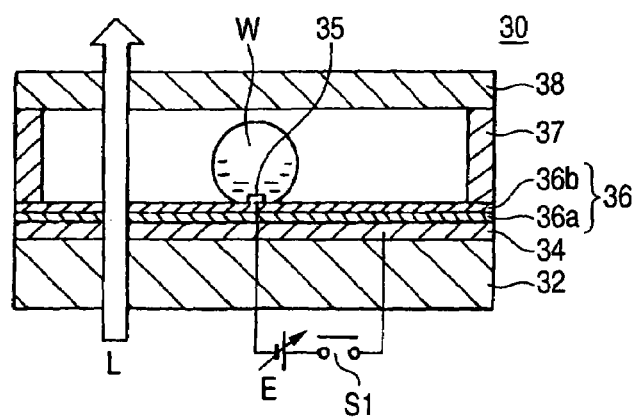

FIGS. 6A to 6C are longitudinal cross-sectional views of a related-art display device adopted as a comparative example, showing the display device in correspondence with FIGS. 4A, 4B, and 4C.

In the drawings, reference numeral 30 designates a related-art display device; 32 designates a first transparent substrate constituting the bottom layer of the display device 30; 34 designates a first transparent substrate provided on top of the first transparent substrate 32; 35 designates a second transparent electrode; and 36 designates an insulation layer. The insulation layer 36 is constituted of an insulation film 36a, and a low surface energy film 36b provided on top of the insulation film 36a. Reference numeral 37 designates a cavity partition; and 38 designates a second transparent substrate constituting the top layer of the display device 30.

Reference symbol "E" denotes a d.c. power source whose negative side is connected to the second transparent electrode 35 and whose positive side is connected to one side of a switch S1; and S1 denotes a switch to be used for opening and closing a connection between the positive side of the d.c. power source E and the first transparent electrode 34. Reference symbol W denotes a droplet of a coloring liquid.

As a matter of course, the related-art display device has no third transparent electrode (indicated by 19 in FIGS. 4A to 4C).

Operation of the display device 30 shown in FIGS. 6A to 6C will now be described.

FIG. 6A shows a state in which the switch is held in an OFF position; i.e., a steady state assumed by the droplet of a coloring liquid; FIG. 6B shows a black display state; and FIG. 6C shows a white display state.

In FIG. 6A, the switch S1 remains in OFF (open) position, wherein the state of the droplet of the coloring liquid is a "droplet shrinkage" (spherical) state. Accordingly, light L passes through, in this order, the first transparent substrate 32, the first transparent electrode 34, the insulation film 36a, the low surface energy film 36b, the inside of the cavity, and the second transparent substrate 38. Hence, the display becomes bright.

FIG. 6B shows that the switch S1 is in an ON position. As a result, the voltage E is applied between the first transparent electrode 34 and the second transparent electrode 35, whereupon the first transparent electrode 34 becomes positive and the second transparent electrode 35 becomes negative. Since the droplet W of a coloring liquid induces electric charges on the surface of the liquid, the droplet W of a coloring liquid is attracted by the first transparent electrode 34 remaining at the positive potential, whereby the droplet of a coloring liquid spreads fully over the bottom of the cavity.

Consequently, the light L reaches the droplet W of a coloring liquid remaining in the cavity after having passed through, in this order, the first transparent substrate 32, the first transparent electrode 34, and the insulation film 36a, the low surface energy film 36b. The light is then shielded by the droplet, whereupon the display becomes dark.

In FIG. 6C, the switch S1 is again brought into the OFF position, whereby the positive potential assumed by the first transparent electrode 34 by that time is eliminated, and the droplet W of a coloring liquid then naturally returns to the steady state; i.e., the "liquid shrinkage" (spherical) state by means of a water repellent characteristic.

Therefore, the light L passes through, in this order, the first transparent substrate 32, the first transparent electrode 34, the insulation film 36a, the low surface energy film 36b, the inside of the cavity, and the second transparent substrate 38. Hence, the display again returns to a bright state.

Table 1 shows results obtained by measurement of a rise time and a fall time in connection with the example 1-1 and the comparative example 1-1.

TABLE 1

|  | RISE TIME (msec.) | FALL TIME (msec.) |
| --- | --- | --- |
| EXAMPLE 1-1 | 15 | 19 |
| COMPARATIVE EXAMPLE 1-1 | 15 | 550 |

As can be seen from Table 1, the example 1-1 has attained a rise time of 15 (msec.) and a fall time of 19 (msec.). In contrast, the comparative example 1-1 has attained a rise time of 15 (msec.), which is identical with that achieved by the example 1-1, and a fall time of 550 (msec.), which is delayed by one order of magnitude or more as compared with the example 1-1. Specifically, according to the comparative example 1-1, the spread of the droplet of a coloring liquid is accelerated by an electric field. However, the droplet is caused to return by means of only the water repellent characteristic, and hence returning of the droplet becomes slow, thus deteriorating responsiveness.

In contrast, according to the invention, returning of the droplet is accelerated by the third electrode, and hence an improvement in display responsiveness can be ascertained.

Second Embodiment

Figure 7A:
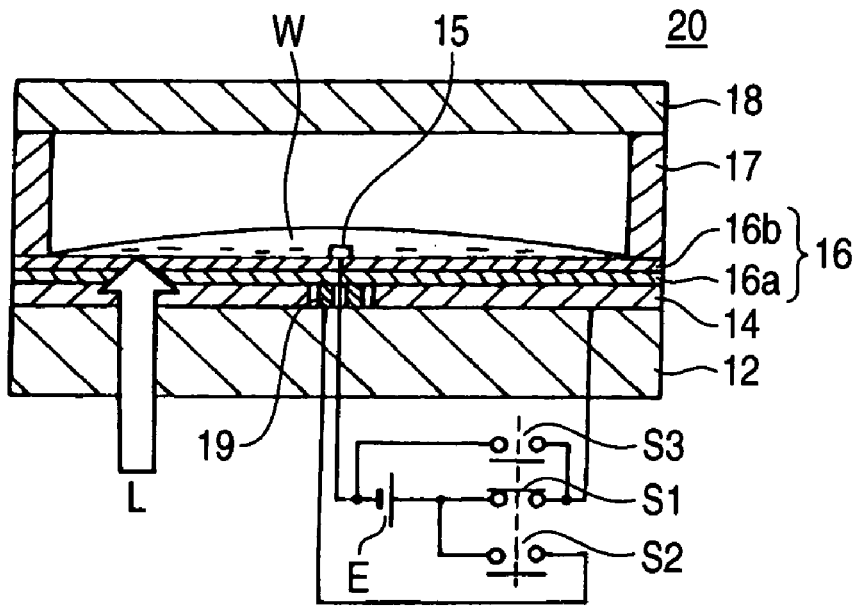
FIG. 7A is a longitudinal cross-sectional view of the display device obtained at the time of a dark display in a second embodiment of the invention.
Figure 7B:
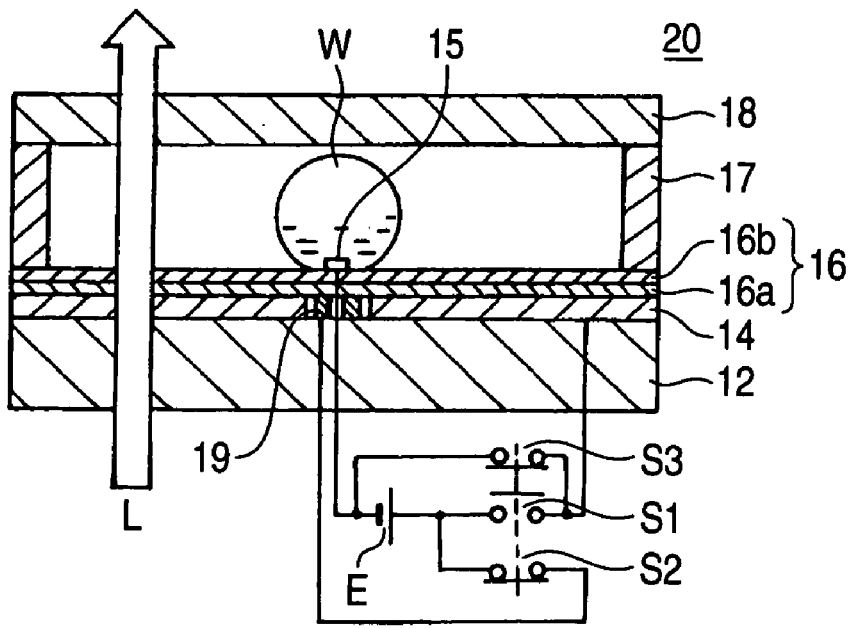
FIG. 7B is a longitudinal cross-sectional view of the display device obtained at the time of a bright display in the second embodiment of the invention.

FIG. 7 relates to a second embodiment of the invention, wherein FIG. 7A is a longitudinal cross-sectional view taken at the time of dark display and FIG. 7B is a longitudinal cross-sectional view taken at the time of bright display.

In the drawing, reference numeral 20 designates a display device according to the second embodiment of the invention; the display device is identical in configuration with the display device of the first embodiment, and hence its explanation is omitted.

A difference between the display devices of the first and second embodiments lies in that a third switch S3 is provided and the first transparent electrode is actively utilized even at the time of restoration of a droplet, to thereby accelerate a shift from the dark display to the bright display to a much greater extent.

The switch S3 that operates in the same manner as does the switch S2 (i.e., the switch is activated when the switch S1 is in an OFF position and is deactivated when the switch S1 is in an ON position) is interposed between the negative side of the d.c. power source E and the first transparent electrode 14.

Operation of the display device 20 shown in FIG. 7 will now be described.

FIG. 7A shows that the switch S1 is in an ON position and the switches S2, S3 are in OFF positions. This state is identical with that shown in FIG. 4B. Consequently, a voltage is applied between the first and second transparent electrodes 14, 15. The first transparent electrode 14 is positive, and the second transparent electrode 15 is negative. The droplet W of a coloring liquid whose surface has induced electric charges is attracted by the first transparent electrode 14 remaining at the positive potential. Hence, the droplet of a coloring liquid spreads fully over the bottom of the cavity. Consequently, the light L reaches the droplet W of a coloring liquid stored in the cavity after having passed through, in this order, the first transparent substrate 12, the first transparent electrode 14, the insulation film 16a, and the low surface energy film 16b. The light is shielded by the droplet W, and hence the display becomes dark.

In FIG. 7B, there arises rapid switching to a bright display, and as in the case shown in FIG. 4C the switch S1 is deactivated, and the switch S2 is activated, to thereby render the second transparent electrode 15 negative and the third transparent electrode 19 positive. Further, the switch S3 is activated, thereby rendering the first transparent electrode 14 negative. As a result, the droplet W of a coloring liquid is attracted by the third transparent electrode 19 remaining at a positive potential of the first embodiment and repels the first transparent electrode 14 remaining at a negative potential. Hence, the droplet W of a coloring liquid acceleratingly shrinks from the spread state shown in FIG. 7A to a spherical shape.

Consequently, the light L passes through, in this order, the first transparent substrate 12, the first transparent electrode 14, the insulation film 16a, the low surface energy film 16b, the inside of the cavity, and the second transparent substrate 18. Hence, the display rapidly becomes bright.

Although in the above descriptions the applied voltage is set solely to 0 and E, half-tone brightness can also be controlled by means of controlling the extent to which the coloring liquid spreads through various adjustments of the applied voltage within the range of 0 to E.

Third Embodiment

Figure 8A:
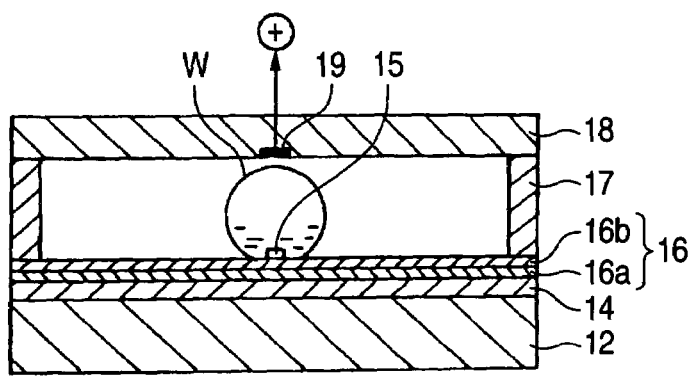
FIG. 8A relates to a modification of the location where the third transparent electrode of a third embodiment of the invention is mounted, showing an example in which the third transparent electrode is provided at the center of the cavity's ceiling.
Figure 8B:
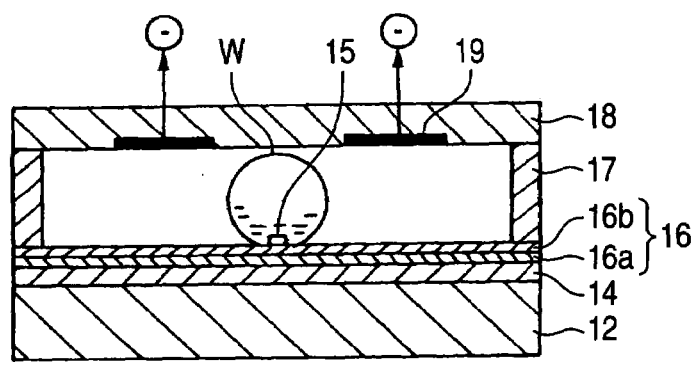
FIG. 8B relates to a modification of the location where the third transparent electrode of a third embodiment of the invention is mounted, showing an example in which the third transparent electrode is provided in an annular pattern on the cavity's ceiling.
Figure 8C:
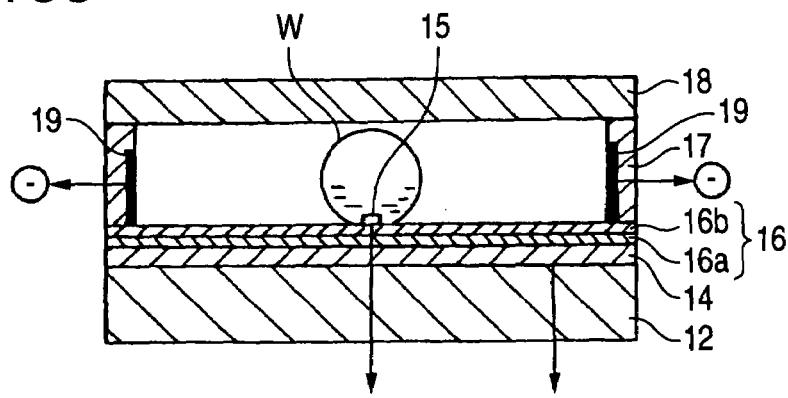
FIG. 8C relates to a modification of the location where the third transparent electrode of a third embodiment of the invention is mounted, showing an example in which the third transparent electrode is provided in a cavity partition.

FIG. 8 relates to a modification of the location where the third transparent electrode of the third embodiment of the invention is mounted. FIG. 8A shows an example in which the third transparent electrode is provided at the center of the cavity's ceiling; FIG. 8B shows an example in which the third transparent electrode is provided in an annular pattern on the cavity's ceiling; and FIG. 8C shows an example in which the third transparent electrode is provided in a cavity partition.

FIGS. 8A to 8C are views showing that rapid conversion arises from the dark display to the bright display. The display device is entirely identical in configuration with that shown in FIG. 3, except the position where the third transparent electrode 19 is provided, and hence description of the configuration and operation of the display device will be omitted.

FIG. 8A will first be described.

In FIG. 8A, the third transparent electrode 19 is a circular transparent electrode having a small area and provided at the center of the cavity's ceiling; that is, the center of the second transparent substrate 18 constituting the top layer of the display device. When rapid switching is effected from the dark display to the bright display, the third transparent electrode is rendered positive as illustrated, the droplet W of a coloring liquid whose surface has induced electric charges is attracted by the third transparent electrode 19, and hence the droplet W of a coloring liquid acceleratingly shrinks into the spherical shape shown in FIG. 8A.

FIG. 8B will now be described.

In FIG. 8B, the third transparent electrode 19 is a large annular transparent electrode concentric with the second transparent electrode 15 and provided on the second transparent substrate 18 serving as the cavity's ceiling. When rapid conversion arises from the dark display to the bright display, the third transparent electrode is rendered negative as illustrated. The droplet W of a coloring liquid whose surface has induced electric charges repels the third transparent electrode 19 and shrinks acceleratingly to the spherical shape shown in FIG. 8B.

FIG. 8C will now be described.

In FIG. 8C, the third transparent electrode 19 is provided in the cavity partition 17. When rapid conversion arises from the dark display to the bright display, the third transparent electrode is made negative as illustrated. As a result, the droplet W of a coloring liquid whose surface has induced electric charges repels the third transparent electrode 19. Consequently, the droplet W of a coloring liquid shrinks acceleratingly into the spherical shape shown in FIG. 8C.

Three modifications of the third electrode described in connection with the first embodiment have been provided. However, two or more modifications, including the first embodiment, can be used in combination. Such combined use of the invention is recommended.

Fourth Embodiment

Figure 9A:
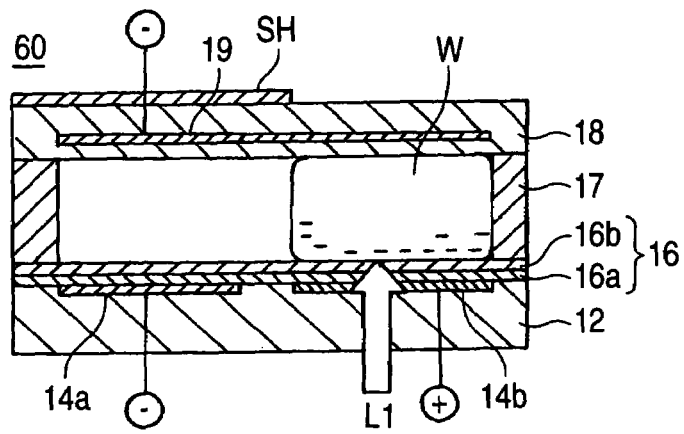
FIG. 9A relates to a fourth embodiment of the invention, showing a dark display.

FIG. 9 relates to a fourth embodiment of the invention, wherein FIG. 9A shows a dark display; FIG. 9B shows a bright display; and FIGS. 9C and 9D show a circuit diagram of the display device.

In the drawings, reference numeral 60 designates a display device of the fourth embodiment; 12 designates a first transparent substrate constituting the lowest layer of a display device 60; and 14a, 14b designate a first transparent electrode provided on top of the first transparent substrate 12. Reference numeral 16 designates an insulation layer, and the insulation layer 16 is formed from a lower insulation film 16a, and a low surface energy film 16b provided on top of the insulation film 16a. Reference numeral 17 designates a cavity partition; 18 designates a second transparent substrate constituting the top layer of the display device 60; 19 designates a second transparent electrode; SH denotes a light-shielding shade; and W denotes a droplet of a coloring liquid. The first transparent electrodes 14a, 14b and the second transparent electrode 19 constitute a pair of electrodes which oppose each other. The first transparent electrode 14a is housed in the bounds of the shade SH when viewed from the top, and the first transparent electrode 14b is housed outside the bounds of the shade SH when viewed from the top.

Figure 9B:
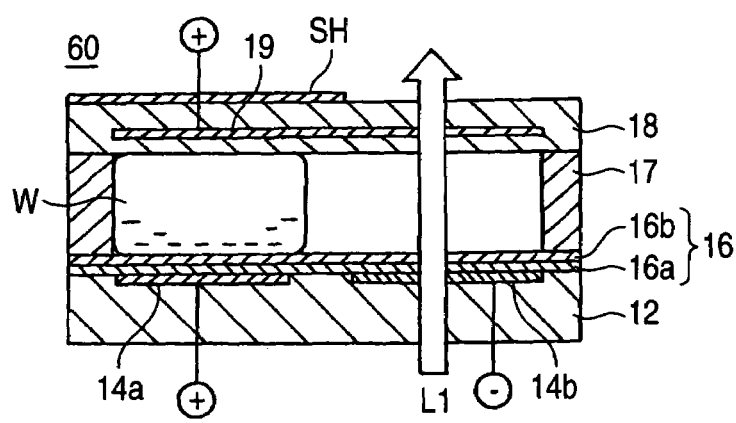
FIG. 9B relates to a fourth embodiment of the invention, showing a bright display.
Figure 9C:
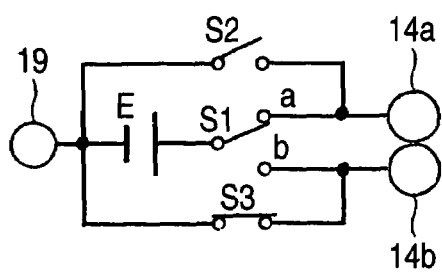
FIG. 9C relates to a fourth embodiment of the invention, showing a circuit diagram of the display device.
Figure 9D:
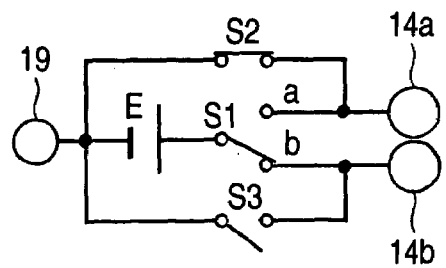
FIG. 9D relates to a fourth embodiment of the invention, showing a circuit diagram of the display device.

In FIGS. 9C and 9D, E denotes a d.c. power source, and the positive side of the power source E is connected to a common node of a two-terminal changeover switch S1, and the negative side of the power source E is connected to the second transparent electrode 19.

One terminal "a" of the two-terminal changeover switch S1 is connected to the first transparent electrode 14a, and the other terminal "b" is connected to the first transparent electrode 14b.

Of the two on-off switches S2, S3, the switch S2 is connected between the first transparent electrode 14a and the second transparent electrode 19, and the switch S3 is connected between the first transparent electrode 14b and the second transparent electrode 19.

FIG. 9C shows that the switch S1 is connected to the terminal "a"; the switch S2 is held in an OFF (open) position; and the switch S3 is held in an ON (closed) position. Therefore, the first transparent electrode 14a remains at a positive potential; and the first transparent electrode 14b and the second transparent electrode 19 remain at a negative potential.

FIG. 9D shows that the switch S1 is connected to the terminal "b"; the switch S2 is held in the ON position; and the switch S3 is held in the OFF position. Consequently, the first transparent electrode 14b remains at a positive potential; and the first transparent electrode 14a and the second transparent electrode 19 remain at a negative potential.

Operation of the display device according to the fourth embodiment will now be described.

FIG. 9A is a view for describing a dark display state of the display device 60. The switches remain in the state shown in FIG. 9D. Consequently, the pair of electrodes formed from the first transparent electrode 14a and the second transparent electrode 19 remain negative, and the first transparent electrode 14b remains positive. The surface of the droplet of a coloring liquid has induced negative electric charges, and hence the droplet undergoes repulsion originating from the first and second transparent electrodes 14a, 19 and the attractive force originating from the first transparent electrode 14b. As shown in FIG. 9A, the droplet has rapidly moved outside the bounds of the shade SH. Therefore, backlight is shielded by the droplet of a coloring liquid, thereby rendering the display dark.

Next, the switches are brought into the state shown in FIG. 9C, whereupon the first transparent electrode 14a becomes positive and the first transparent electrode 14b and the second transparent electrode 19 become negative. The surface of the droplet of a coloring liquid has induced negative electric charges, and hence the droplet undergoes the attractive force originating from the first transparent electrode 14a and the repulsion originating from the first transparent electrode 14b and the second transparent electrode 19. As shown in FIG. 9B, the droplet of a coloring liquid moves rapidly to the bounds of the shade SH. Consequently, backlight is not shielded by the droplet of a coloring liquid, thereby rendering the display bright.

In the above descriptions, the applied voltage is subjected to binary control between 0 (bright) and E (dark) However, as a matter of course, the half-tone brightness can be controlled by means of variably changing the applied voltage between 0 and E in the same manner as in the previous embodiments, to thus control the size to which the droplet of a coloring liquid spreads.

The display device of the embodiment of the invention is compared with the LCD display. In relation to the luminance of the LCD display, the quantity of light is reduced by 60% by means of a first polarizing plate. The light is further reduced by 5% when passing through liquid crystal. When a numerical aperture is presumed to be 60%, the total quantity of light is reduced by 40%. Subsequently, the light is further reduced by the second polarizing plate by 20%. Hence, provided that backlight has a light quantity of 100%, the quantity of backlight finally reaches an optical organ is a mere 18%.

In contrast, the display device of the embodiment of the invention does not use any polarizing plate. Hence, a decrease in the quantity of light, which would otherwise be caused by use of a polarizing plate, is reduced. Backlight is assumed to decrease by 5% in the display device, and the numerical aperture is presumed to be 50% (corresponding to the first embodiment). Hence, provided that backlight has a light quantity of 100%, the quantity of backlight that finally reaches an optical organ has increased up to about 47%. Consequently, other embodiments achieved by improving the first embodiment will further decrease the degree of attenuation of light.

The LCD display has a contrast ratio of about 600:1 in a dark room. In contrast, the display device of the embodiment of the invention has achieved a contrast ratio of 1000:1 in a bright room and 5000:1 in a dark room.

The LCD display has a viewing angle dependency such that the LCD display has an angle of view of 160° in both the vertical and horizontal directions (defined as a range at which CR is at least a ratio of 10:1). In contrast, the display device of the embodiment of the invention has no viewing angle dependency.

As can be seen from Table, 1, as compared with the display device that is shown in FIG. 6 and employs the same electrowetting phenomenon, the fall speed of the display device of the embodiment of the invention has been increased by one order of magnitude or more. The display device has turned out to be suitable for high-speed animation.

Fifth Embodiment

Figure 10A:
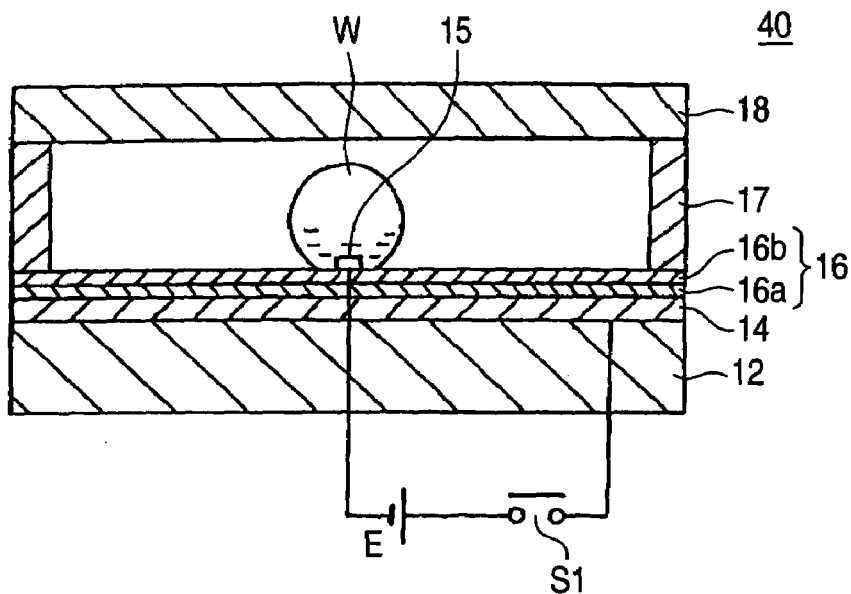
FIG. 10A is a longitudinal cross-sectional view in a fifth embodiment of the invention.
Figure 10B:
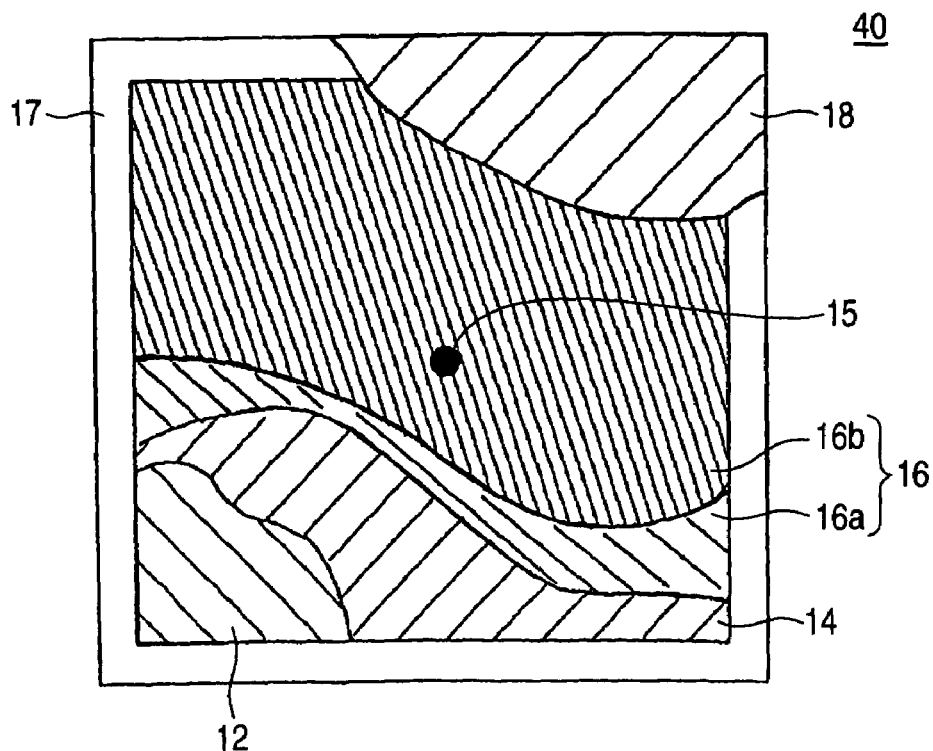
FIG. 10B is a partial cutaway plan view in the fifth embodiment of the invention.

FIG. 10 relates to a fifth embodiment of the invention, wherein FIG. 10A is a longitudinal cross-sectional view, and FIG. 10B is a partial cutaway view.

In the drawings, reference numeral 40 designates a display device according to a fifth embodiment of the invention; 12 designates a first transparent substrate constituting the lowermost layer of the display device 40; 14 designates a first transparent electrode provided on the first transparent substrate 12; and 15 designates a second transparent electrode. For instance, ITO (Indium Tin Oxide) is mentioned as a material for the transparent electrodes.

Reference numeral 16 designates a dielectric layer which is formed from a lower insulation (dielectric) film 16a, and a low surface energy film 16b provided on the insulation film 16a.

According to the embodiment of the invention, the lower insulation film 16a assumes a specific inductive capacity of three or more and a thickness ranging from 10 nm to 100 nm.

Use of the low surface energy film 16b, which is a film formed from material possessing superior water repellency, enables the liquid placed on the low surface energy film 16b to maintain a spherical shape without spreading. The low surface energy film 16b assumes a thickness of 100 nm or less, a surface energy of 20 mN/m or less, and a surface roughness ranging from 5 nm to 45 nm.

Grounds for restricting the ranges set forth is supported by an embodiment which will be described later.

Reference numeral 17 designates a cavity partition; and 18 designates a second transparent substrate constituting the top layer of the display device 40.

The first transparent electrode 14 is laid over the entire bottom surface of the display device 40, except for a nominal aperture formed in the center of the bottom surface of the same.

The second transparent electrode 15 is placed on top of the low surface energy film 16b. As can be seen from FIG. 10B, the second transparent electrode 15 is located at the center of the first transparent electrode 14 when viewed from the top.

Reference symbol E denotes a d.c. power source whose negative side is connected to the second transparent electrode 15 and whose positive side is connected to one end of a switch S1. Reference symbol S1 denotes a switch to be used for connecting and disconnecting the positive side of the d.c. power source E to and from the first transparent electrode 14 in a reclosable manner. Reference symbol W denotes a droplet of a coloring liquid.

Here, the dielectric film 16a, the low surface energy film 16b, an area ratio, and a drive voltage E will be described in detail.

(Dielectric Film 16a)

According to the embodiment of the invention, the dielectric film (insulation film) 16a having an electrical insulating characteristic is provided so as to prevent direct flow of an electric current into the droplet W from the electrode 14. No limitations are imposed on the kind of a material used for the dielectric film 16a, so long as the material has a specific inductive capacity of three or more. Elements described in, e.g., "Kagaku Binran (Handbook of Chemistry), Basic 4$^{th}$ Ed." from II-502 to II-508, published by Maruzen Company Limited, can be used. Particularly, use of PZT-based materials, such as $Al_2O_3$, $AlN$, $HfO_2$, $ZnO$, $TiO_2$, and $SiC$, is preferable.

When consideration is given to a display element of transparent type, transmissivity of visible light preferably assumes a value of 50% or more, more preferably a value of 70% or more, much more preferably a value of 80% or more.

The display element assumes preferably a thickness of 10 nm to 1 μm; more preferably a thickness of 10 nm to 500 nm; much more preferably a thickness of 10 nm to 300 nm; and most preferably a thickness of 10 nm to 100 nm.

When the dielectric film 16a assumes a thickness of less than 10 nm, the electric current flows into the droplet W by way of the dielectric film 16a and the low surface energy film 16b. Hence, a thickness of less than 10 nm is not preferable for the dielectric film 16a.

(Low Surface Energy Film 16b)

No limitations are imposed on the kind of material to be used for the low surface energy film 16b, so long as the film has low surface energy. For instance, materials described in, e.g., JP-A-7-188416, JP-A-7-242774, JP-A-10-314669, and JP-A-11-263860, can be used. Specifically, use of fluorine-based materials or silicon-based materials is preferable. More specifically, polytetrafluoroethylene, polytetrafluoroethylene-ethylene copolymer, polytetrafluoroethylene-perfluoroalkylvinylether copolymer, perfluoroalkylpolyoxyethyleneethanol, and silicon oxide are preferable.

Use of a film having a root-mean-square roughness (hereinafter called simply a "surface roughness") of 0 nm to 5 nm for the low surface energy film 16b may also be used. However, as described in JP-A-11-263860, if the surface roughness of the film falls within the range of 8 nm to 45 nm, the contact angle of the droplet W can be maintained at a high value. For this reason, the surface roughness ranging from 8 nm to 45 nm is preferable. If the surface roughness exceeds 45 nm, scattering of light will become greater, resulting in a failure to achieve superior transparency. For this reason, a material having a surface roughness of more than 45 nm is not preferable.

(Area Ratio)

Figures 11A, 11B:
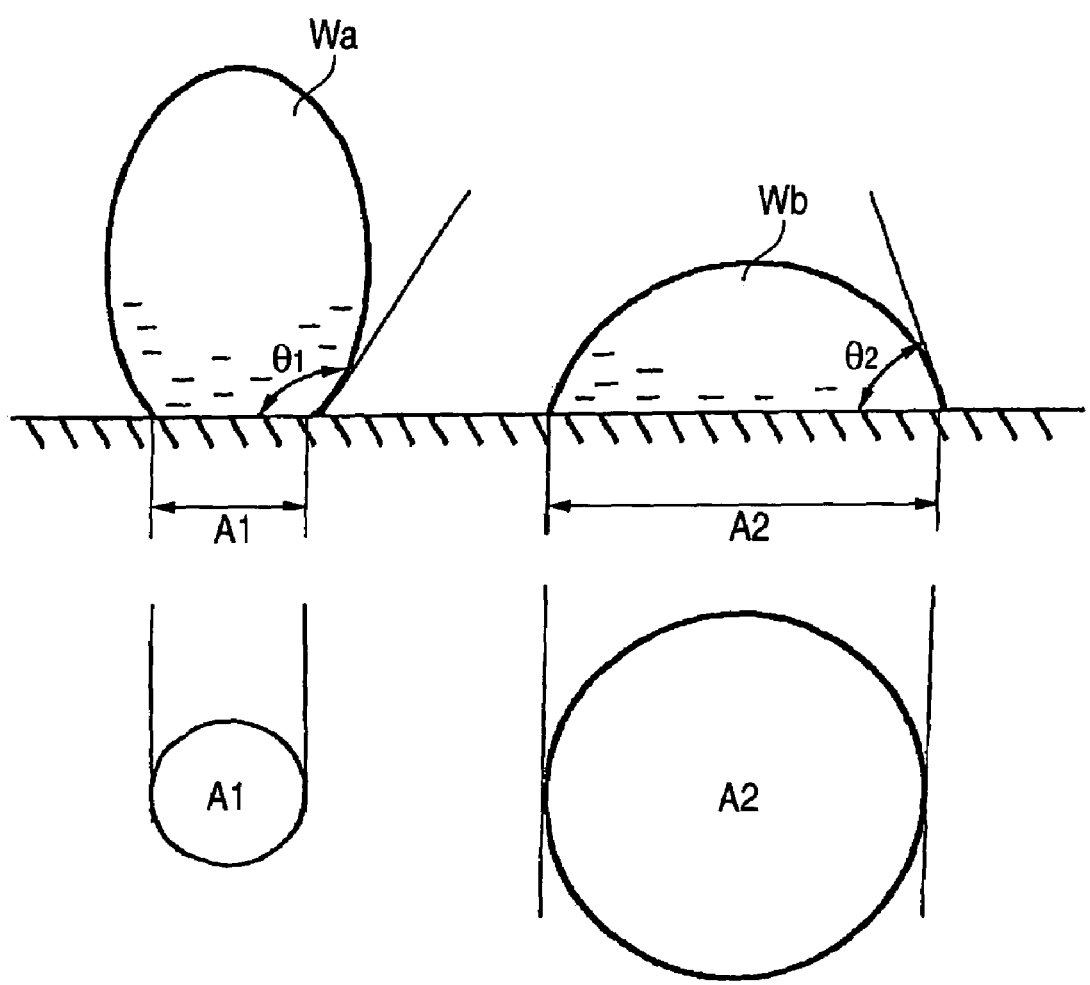
FIG. 11A is a view showing droplet Wa which is provided on a low surface energy film 16b, the droplet having a large contact angle $\theta_1$.
FIG. 11B is a view showing droplet Wb having an identical volume with that of Wa which are provided on a low surface energy film 16b, the droplet having a small contact angle $\theta_2$.

FIGS. 11A and 11B show droplets Wa, Wb which are placed on the low surface energy film 16b at different contact angles θ and have the same volume. As can be seen from FIGS. 11A and 11B, the droplet Wb remains spread, and the droplet Wa remains spherical. Therefore, the droplet Wb occupies a surface area A2 larger than a surface area A1 occupied by the droplet Wa. The reason why two liquids occupy different surface areas is that the liquids have specific energy relationships with the surface and make specific contact angles θ with respect to the predetermined surface.

The lower the energy interacting between a liquid and the surface, the greater the contact angle θ, and the smaller an occupied area S.

According to the embodiment of the invention, the state of S2 corresponds to black display, and the state of S1 corresponds to white display. In order to achieve greater contrast, the area ratio between the states (A2/A1) should preferably be increased. The area ratio preferably assumes a value of 1.2 or more. When the area ratio assumes a value of less than 1.2, and consideration is given to one element, the element will assume a maximum numerical aperture of 20% and a maximum light utilization efficiency of 20% or thereabouts. This display device achieves substantially the same light utilization efficiency as that achieved by the related-art liquid-crystal display and encounters difficulty in achieving high contrast and high luminance.

(Drive Voltage E)

A lower drive voltage is preferable as the drive voltage E for the element of the invention. Taking into comprehensive consideration the withstand voltage, durability, and safety of the insulation film, and the performance of the driver, a voltage of 30 V or less is preferably employed as the drive voltage. More preferably, the element is driven at a voltage of 20 V or less, and further preferably at a voltage of 10 V or less.

Operation of the display device 40 shown in FIG. 10 will now be described by reference to FIG. 12.

Figure 12A:
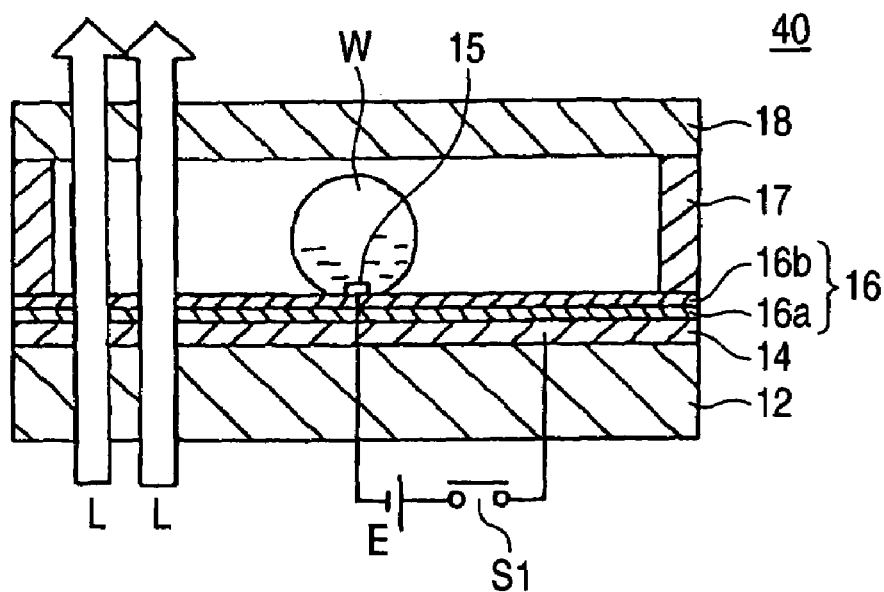
FIG. 12A is a view for describing the service condition of the display device shown in the fifth embodiment of the invention, showing a steady state (bright display) of a droplet of a coloring liquid achieved when a switch S1 is in an OFF position.
Figure 12B:
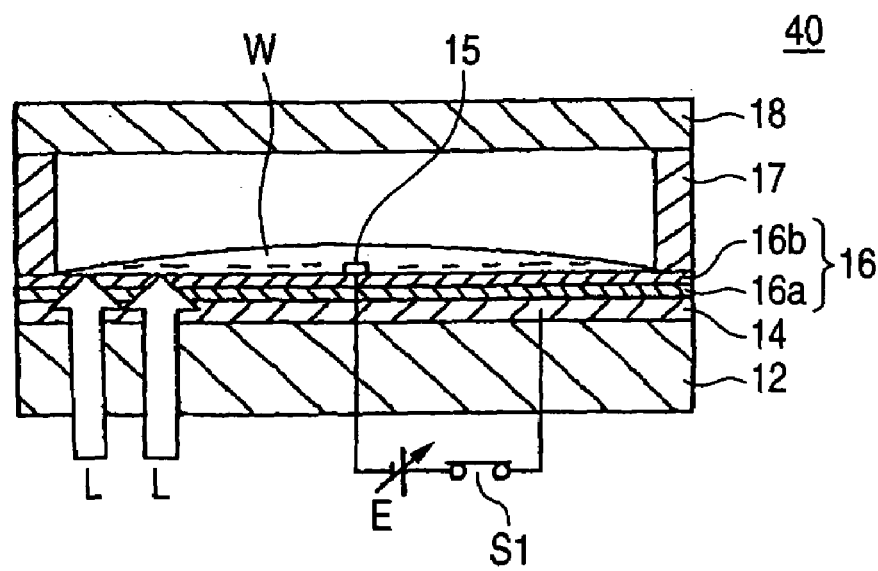
FIG. 12B is a view for describing the service condition of the display device shown in the fifth embodiment of the invention, showing a dark display state of the droplet.

FIG. 12 is a view for describing the display device shown in FIG. 10 when remaining operative. FIG. 12A shows a steady state (i.e., bright display) of a droplet of a coloring liquid when the switch S1 remains in an OFF position, and FIG. 12B shows a dark display state.

In FIG. 12A, the switch S1 remains in the OFF (open) position, wherein the state of the droplet of a coloring liquid is a "droplet shrinkage" (spherical) state. Accordingly, the light L having entered from the first transparent substrate 12 passes through, in this order, the first transparent substrate 12, the first transparent electrode 14, the insulation film 16a, the low surface energy film 16b, the inside of the cavity, and the second transparent substrate 18. Hence, the display becomes bright.

FIG. 12B shows that the switch S1 is in an ON position. As a result, the voltage is applied between the first transparent electrode 14 and the second transparent electrode 15, whereupon the first transparent electrode 14 becomes positive and the second transparent electrode 15 becomes negative. When the voltage is applied between the first and second transparent electrodes 14, 15, the droplet W of a coloring liquid induces negative electric charges on the surface of the liquid, and hence the droplet W of a coloring liquid is attracted by the first transparent electrode 14 remaining at the positive potential, whereby the droplet of a coloring liquid spreads fully over the bottom of the cavity.

Consequently, the light L having entered the first transparent substrate 12 reaches the droplet W of a coloring liquid remaining in the cavity after having passed through, in this order, the first transparent substrate 12, the first transparent electrode 14, the insulation film 16a, and the low surface energy film 16b. The light is then shielded by the droplet, whereupon the display becomes dark.

In FIG. 10, the contact angle θv formed by application of the voltage V (V=0 and E) between the first and second electrodes 14, 15 is also known to be given by Eq. (4), provided that the thickness of an insulation layer 16 formed by combination of the insulation film 16a and the low surface energy film 16b is taken as "d"; the specific inductive capacity of the insulation layer 16 is taken as "∈"; the interfacial tension existing between the droplet W and the low surface energy film 16b is taken as "γ"; and the dielectric constant of a vacuum is taken as ∈0 (see "Electrowetting of water and aqueous solutions on poly(ethylene terephthalate)" Vallet, Berge, Vovelle, Polymer, Vol. 37, No. 12, pg. 2465 (1996).).

$$\cos \theta(V) - \cos \theta(0) = \epsilon_0 \times \epsilon \times v^2/(2d \times \gamma) \quad (4)$$

As mentioned above, Eq. (4) quantitatively shows that the contact angle θ is changed by application of the voltage V and that the shape of the droplet W can be controlled.

A change in the contact angle θ and control of the shape of the droplet W can be seen to be realized by means of the specific inductive capacity ∈ and the thickness "d" as well as by means of application of the voltage V.

An embodiment—in which various tests are conducted while variables are changed—will now be described in consideration of the foregoing descriptions.

If the surface area ratio is 1.2 or more, there will be yielded an advantage over the related-art liquid-crystal display device. Therefore, the display device that has achieved a surface area ratio of 1.2 or more is taken as satisfactory, and the display device that has achieved a surface area ratio of less than 1.2 is taken as unsatisfactory.

Table 2 shows the results of testing appropriate specific inductive capacity ∈ for a dielectric material. The example 2-1 employs TiO$_2$ having a specific inductive capacity ∈ of 80 as a dielectric material; the example 2-2 employs ZnO having a specific inductive capacity ∈ of 8 as a dielectric material; and the example 2-3 employs SiO$_2$ having a specific inductive capacity ∈ of 3 as a dielectric material. The dielectric materials were formed to a thickness of 100 nm, and a water repellent agent to be applied was employed.

Teflon (trade name) having a specific inductive capacity ∈ of 2.1 was used as a comparative example 2-1.

Here, the low surface energy film has a thickness of 1 µm, a surface energy of 20 (mN/m), and a surface roughness of 10 nm.

Further, the drive voltage was set to 10 V, 20 V, and 30 V. Table 2 shows results of the tests.

TABLE 2

| Specific Inductive capacity ∈ | Drive Voltage V | | |
|---|---|---|---|
| | 10 V Surface Area Ratio | 20 V Surface Area Ratio | 30 V Surface Area Ratio |
| 80 | 3.2 | 3.4 | 3.9 |
| 8 | 1.0 | 1.3 | 2.9 |
| 3 | 1.0 | 1.0 | 1.2 |
| 2.1 | 1.0 | 1.0 | 1.0 |

As can be seen from Table 2, in the example 2-1, when the drive voltage V is 10 (V), a surface area ratio has already achieved a value of 3.2 and exceeded an area ratio of 1.2. The material employed in the example 2-1 can be sufficiently used as a display device. Further, the surface area ratio has also increased to 3.4 and further to 3.9 as the drive voltage V is increased to 20 (V) and further to 30 (V).

According to the example 2-2, the surface area ratio has achieved a value of 1.0 when the drive voltage V is 10 (V). Thus, the surface area ratio is lower than the area ratio of 1.2. Hence, the material employed in the example 2-2 cannot be used for a display device. However, as the drive voltage V increases to 20 (V) and further to 30 (V), the surface area ratio increases to 1.3 and further to 2.9. Thus, the surface area exceeds the area ratio 1.2, and hence it is understood that the material can be used for the display device.

According to the example 2-3, when the drive voltage V is 10(V) and 20(V), the surface area ratio of 1.0 is achieved. Hence, the material cannot be used for the display device. However, at a drive voltage V of 30(V), the surface area ratio of 1.2 is achieved. Hence, it is understood that the material can be used for the display device. Although not provided in the table, the area ratio of 2.2 is achieved when the drive voltage has been increased to 40(V).

In contrast, according to the comparative example 2-1, no change arises in the surface area even when the drive voltage V has increased to 10(V), 20(V), and 30(V). Accordingly, the area ratio is 1.0, and the material cannot be used for the display device.

As mentioned above, when the low surface energy film has a thickness of 100 nm, a surface energy of 20 (mN/m), and a surface roughness of 10 nm, a material having specific inductive capacity ∈ of three or more has turned out to be suitable for an insulation film.

Surface area ratios to be achieved at drive voltages of 20V and 30V were examined, by use of a material having a surface energy γ of 15 mN/m for the example 2-4; a material having a surface energy γ of 20 mN/m for the example 2-5; a material having a surface energy γ of 25 mN/m for a comparative example 2-2; and a material having a surface energy γ of 30 mN/m for a comparative example 2-3.

A dielectric material having a specific inductive capacity ∈ of 3 and a thickness of 100 nm was used in all examples, and the thickness of the low surface energy film was set to 100 nm, while the surface roughness was set to 10 nm.

Table 3 shows the results.

TABLE 3

| Surface Energy | Drive Voltage V | |
|---|---|---|
| | 20 V Surface Area Ratio | 30 V Surface Area Ratio |
| 15 | 1.5 | 3.4 |
| 20 | 1.0 | 1.2 |
| 25 | 1.0 | 1.1 |
| 30 | 1.0 | 1.1 |

As can be seen from Table 3, if a material has a surface energy γ of 15 mN/m, a surface area ratio of 1.5 will be achieved. Hence, the material can be used for a display device. If a material has a surface energy γ of 20 mN/m, a surface area ratio of 1.0 will be achieved at a drive voltage V of 20(V). Hence, the material cannot be used for a display device. However, if the drive voltage V is set to 30(V), the surface area ratio of 1.2 is achieved, and hence the material can be used for a display device.

In contrast, the surface area ratio has achieved a value of 1.1 or less at the surface energy γ of 25 mN/m or more. Hence, the performance of the material is not sufficient for use in a display device.

Table 4 shows an example in which surface roughness is controlled.

The example 2-6 employs a material having a surface roughness Ra of 20 (nm); the example 2-7 employs a material having a surface roughness Ra of 10 (nm); the example 2-8 employs a material having a surface roughness Ra of 5 (nm); the comparative example 2-4 has a surface roughness Ra of 3 (nm); and the comparative example 2-5 has a surface roughness Ra of 1 (nm).

There were employed dielectric materials having a specific inductive capacity ∈ of 3 and a thickness of 100 nm. Here, the low surface energy film is set to a thickness of 100 nm the surface energy γ is set to 20 mN/m, and the drive voltage is set to 20 V.

Table 4 shows results of the test.

TABLE 4

| Surface Roughness (nm) | Drive Voltage V | |
|---|---|---|
| | 20 V Surface Area Ratio | 30 V Surface Area Ratio |
| 20 | 1.8 | 2.3 |
| 10 | 1.0 | 1.2 |
| 5 | 1.0 | 1.2 |
| 3 | 1.0 | 1.1 |
| 1 | 1.0 | 1.0 |

As can be seen from Table 4, the greater the surface roughness Ra, the larger the surface area ratio. The surface ratio at which the material can be employed for a display device is 1.2 or more. Hence, surface roughness Ra is understood to assume a value of 5 or more.

A second substrate, including the dielectric and the low surface energy film, is understood to assume a surface roughness of 5 nm or more.

Although not provided in this table, light scattering turns out to become greater at a surface roughness of more than 45 nm. Since no superior transparency is obtained, the second substrate is understood to be not preferable.

As has been described, when the low surface energy film has a thickness of 100 nm and a surface energy of 20 (mN/m) and when the insulation film has a specific inductive capacity ∈ of 3, a surface roughness of 5 nm to 45 nm has turned out to be suitable for the low surface energy film.

The foregoing descriptions can be summarized as follows. The dielectric film 16a shown in FIG. 10 preferably has a specific inductive capacity of 3 or more, and a thickness of 10 to 100 nm. The low surface energy film 16b preferably has a thickness of 100 nm or less, a surface energy of 20 mN/m or less, and a surface roughness of 5 to 45 nm.

Sixth Embodiment

Figure 13A:
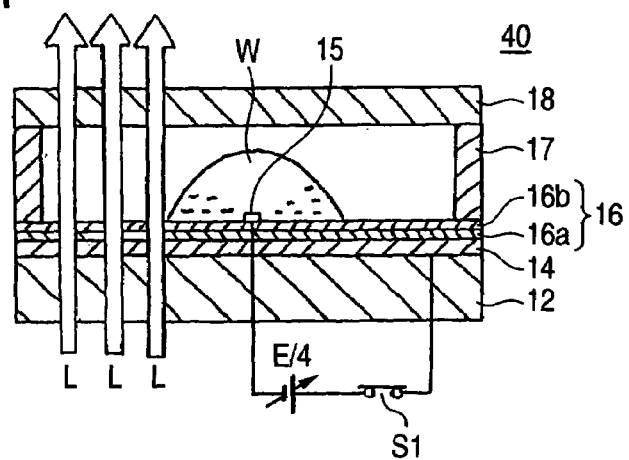
FIG. 13A is a view showing an example of half-tone control according to a sixth embodiment of the invention, showing the case where the voltage applied between the first and second transparent electrodes is $(\frac{1}{4})E$.
Figure 13B:
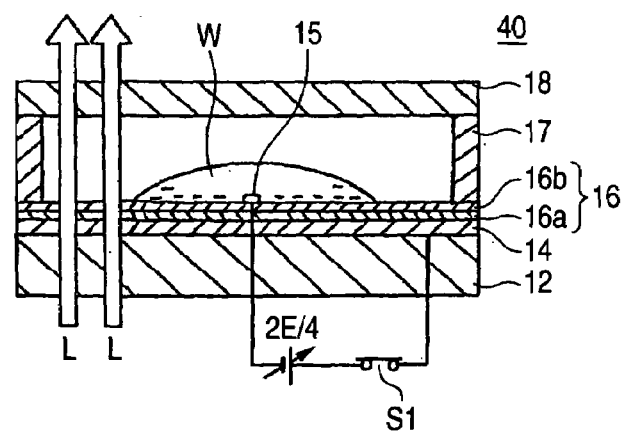
FIG. 13B is a view showing an example of half-tone control according to the sixth embodiment of the invention, showing the case where the voltage applied between the first and second transparent electrodes is $(\frac{1}{2})E$.
Figure 13C:
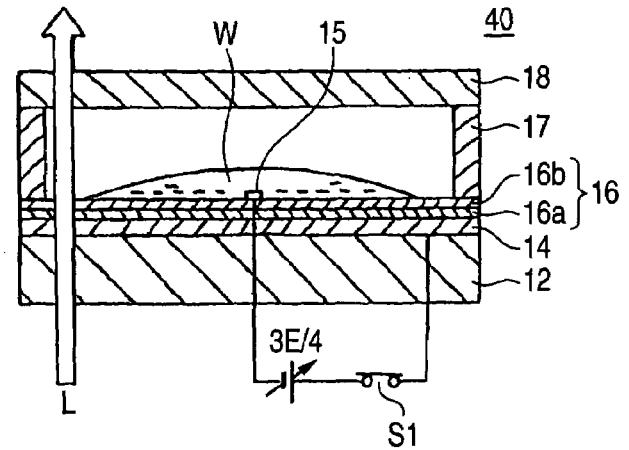
FIG. 13C is a view showing an example of half-tone control according to the sixth embodiment of the invention, showing the case where the voltage applied between the first and second transparent electrodes is $(\frac{3}{4})E$.

FIG. 13 is a view showing an example of half-tone control in connection with a sixth embodiment of the invention, wherein FIG. 13A shows the case where the voltage applied between the first and second transparent electrodes is (¼)E, FIG. 13B shows the case where the voltage is (½)E, and FIG. 13C shows the case where the voltage is (¾)E.

In the drawings, reference numeral 40 designates a display device identical with that described in connection with the fifth embodiment.

As can be seen from FIG. 13A, when a voltage of (¼)E is applied, the droplet spreads to a small extent, and there is achieved brightness corresponding to a transmissivity of about 75%.

The droplet spreads to about half the bottom of the cavity at the applied voltage (½)E shown in FIG. 13B, and there is achieved brightness corresponding to a transmissivity of about 50%.

The droplet spreads to a fair extent, e.g., ¾ of the cavity, at the applied voltage (¾)E shown in FIG. 13C, and there is achieved brightness corresponding to a transmissivity of about 25%.

The half-tone brightness can be controlled by means of changing the applied voltage E within the range of 0 to E.

Even in this case, the specific inductive capacity ∈ of the dielectric material is set to 3, the thickness of the dielectric material is set to 100 nm, the thickness of the low surface energy film is set to 100 nm, the surface energy of the low surface energy film is set to 20 (mN/m), and the surface roughness of the low surface energy film is set to 10 nm. Hence, the droplet of a coloring liquid can be made wide.

Seventh Embodiment

Figure 14A:
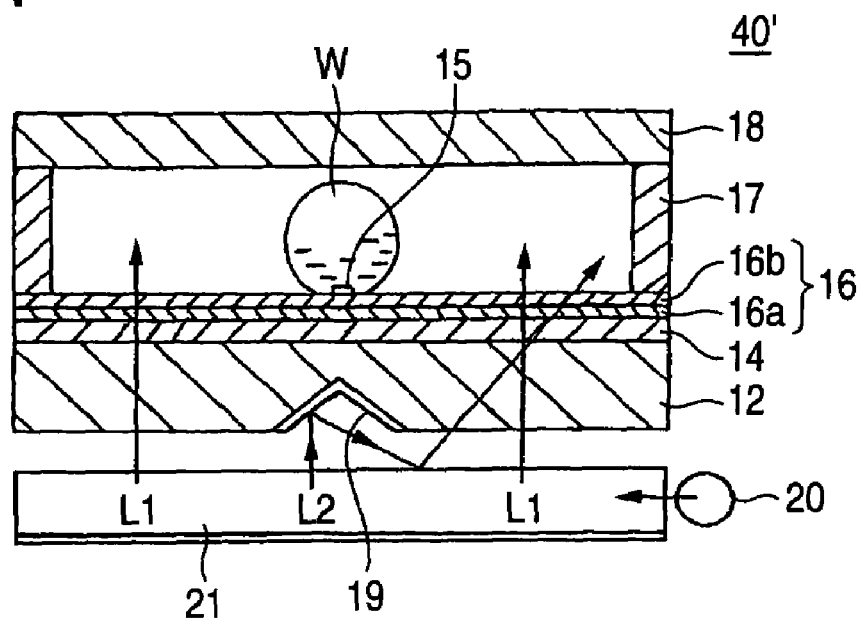
FIG. 14A is a view showing a display device according to a seventh embodiment of the invention for further enhancing light utilization efficiency.
Figure 14B:
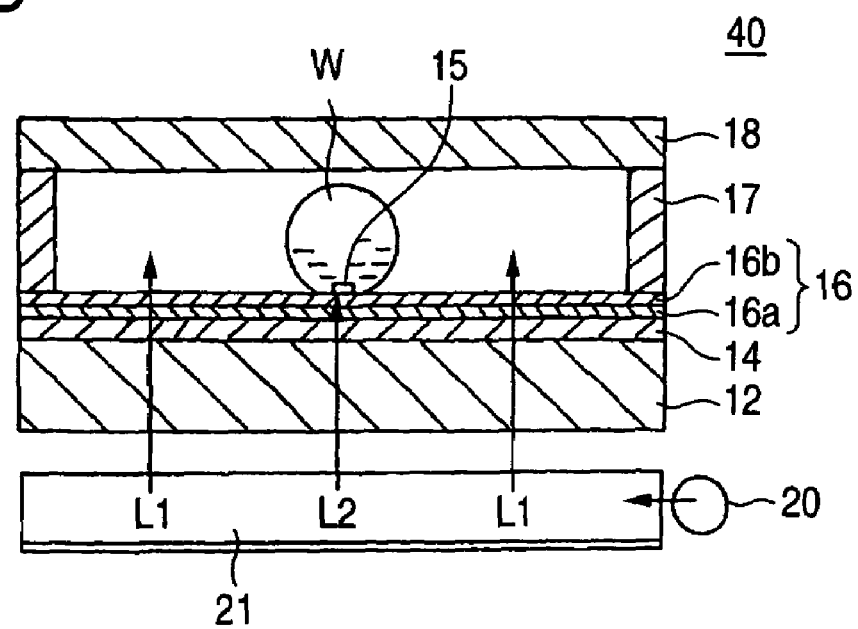
FIG. 14B is a view showing a display device according to the fifth embodiment of the invention.

FIG. 14 shows a display device according to a seventh embodiment of the invention which further improves light utilization efficiency. FIG. 14A shows a display device of the seventh embodiment; and FIG. 14b shows a display device of the fifth embodiment. In the drawings, those reference numerals which are the same as those shown in FIG. 10 (i.e., FIG. 14B) designate the same elements, and their repeated explanations are omitted. Explanations are given of solely a difference. A power source and switches are omitted for convenient reference of the drawings.

Reference numeral 40' designates a display device of the seventh embodiment of the invention; and 19 designates a reflection plate which is provided on an incoming light side of a first substrate 12 within the range of an area in which the droplet W of a coloring liquid is projected on the first substrate 12 in a direction in which light arrives, with no voltage being applied between the first electrode 14 and the second electrode 15. Reference numeral 20 designates a light source; and 21 designates a light guide provided on the surface of the display device 40' facing the first transparent substrate 12. The light guide 21 causes the light originating from the light source 20 to exit in parallel with the first transparent substrate 12.

Operation of the display device 40 will first be described.

In FIG. 14B, the light exiting the light source 20 enters the light guide 21 from the side surface thereof. The light travels toward the first transparent substrate 12 in the form of collimated beams L1, L2. At this time, the beam L1 passing beside the droplet W of a coloring liquid is not shielded by the droplet W of a coloring liquid. Hence, the beam passes through the display device. In contrast, the beam L2 traveling toward the droplet W of a coloring liquid is shielded by the droplet W, thereby failing to pass through the display device. Therefore, even when a numerical aperture is 100%, in reality there is the beam L2 that is shielded by and fails to pass through the droplet W of a coloring liquid. However, the display device shown in FIG. 14A enables the beam L2 traveling toward the droplet W of a coloring liquid to pass through the display device 40'.

Operation of the display device 40' will now be described.

In FIG. 14A, the light emitted from the light source 20 enters the light guide 21 by way of the side surface thereof. The light then exits toward the first transparent substrate 12 as the collimated beams L1, L2. At this time, the beam L1 passing beside the droplet W of a coloring liquid is not shielded by the droplet W and hence passes through the display device. Moreover, the beam L2 traveling toward the droplet W of a coloring liquid is reflected by the reflection plate 19, to thereby return to the light guide 21. The beam is then subjected to reflection by the light guide 21, to thereby then pass beside the droplet W of a coloring liquid.

By means of such a configuration, when the numerical aperture is 100%, in reality the droplet W of a coloring liquid is present, and hence the area corresponding to the droplet W is shielded. Thus, a numerical aperture of 100% is not achieved. The light traveling toward this area is caused to pass through the display device 40' while avoiding the area. Hence, the light utilization efficiency becomes close to 100%, and there is achieved brightness similar to that achieved at a numerical aperture of 100%.

In the case of halftone in which the droplet W of a coloring liquid has spread slightly, the beam L2 traveling toward the droplet W of a coloring liquid is reflected by the reflection plate 19, to thereby return to the light guide 21. The beam is then reflected by the light guide 21, to thereby pass beside the droplet W. Hence, halftone can be addressed by means of extended control of the spread of the droplet W of a coloring liquid plus the light that passes beside the droplet W.

All the embodiments have described a case where the electric charges induced by the surface of the liquid are negative. However, the droplet of a coloring liquid sometimes assumes positive electric charges. In such a case, needless to say, the electric potential applied to the first to seventh electrodes is the reverse of that mentioned in the foregoing description.

Although the present invention has described an example of the display device, the invention can find another conceivable application, such as an optical switch, an optical shutter, and a varifocal lens.

The display device described above is an example of a transmission display device using backlight. As a matter of course, the invention is not limited to such a type of display device. The invention can safely be applied to a display device of reflection type or a display device of semipermeable type. In this case, it goes without saying that the transparent electrodes set forth do not need to be transparent.

As mentioned previously, if three cavities, each having one droplet, are taken as one unit; if the droplets are set to a yellow (Y) droplet, a magenta (M) droplet, and a cyan (C) droplet, or to a red (R) droplet, a green (G) droplet, and a blue (B) droplet; and if color filters are placed in optical paths of the respective cavities, a color display will become feasible.

As has been described, according to the invention, a display device includes a first substrate constituting a lowest layer of the display device, a first electrode provided on the first substrate, an insulation layer provided on the first electrode, a second electrode provided on the insulation layer, a cavity partition surrounding the second electrode with an interval therebetween, a second substrate which is provided on the cavity partition and constitutes the highest layer, and a droplet of a coloring liquid sealed in the cavity partition. In the display device, a third electrode for promoting restoration of the droplet of a coloring liquid to a spherical shape is provided at one or more of the following locations; that is, the vicinity of the second electrode, the inside of the second substrate, and the inside of the cavity partition, while being insulated from the second electrode. Further, the electrodes are formed from transparent electrodes. Hence, when the droplet of a coloring liquid that has been spread for display purpose is restored to an original spherical shape, the third electrode for accelerating restoration operates. Hence, the droplet of a coloring liquid responds at high speed. Consequently, there can be provided a display device adopting an electrowetting phenomenon which enables high-speed display of animation.

In addition, according to the invention, there can be obtained a display device which has a large numerical aperture and superior light utilization efficiency, which has never been achieved by the related-art display device.

What is claimed is:

1. A display device including:
    a first substrate constituting a lowest layer of the display device;
    a first electrode provided on the first substrate;
    an insulation layer provided on the first electrode;
    a second electrode provided on the insulation layer;
    a cavity partition surrounding the second electrode with an interval therebetween;
    a second substrate which is provided on the cavity partition and constitutes a highest layer of the display device;
    a droplet of a coloring liquid sealed in the cavity partition; and
    a third electrode provided for promoting restoration of the droplet of a coloring liquid to a spherical shape.

2. The display device according to claim 1, wherein the third electrode is provided at one or more of the following locations; that is, the vicinity of the second electrode, the inside of the second substrate, and the inside of the cavity partition, while being insulated from the second electrode.

3. The display device according to claim 1, wherein the second or third electrode is a transparent electrode.

4. The display device according to claim 1, further comprising:
    a drive source for changing a droplet of a coloring liquid from a steady state; and
    another drive source for restoring the changed droplet of a coloring liquid to the steady state.

\* \* \* \* \*